US008867057B2

(12) United States Patent
Negishi

(10) Patent No.: US 8,867,057 B2
(45) Date of Patent: Oct. 21, 2014

(54) PRINT CONTROL APPARATUS, METHOD THEREOF, AND MEDIUM STORING A PROGRAM, THAT CONTROL A PRINT PROCESSING BASED ON NUMBER OF SHEETS REQUIRED BY A PRINT JOB

(75) Inventor: Akira Negishi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1464 days.

(21) Appl. No.: 11/848,317

(22) Filed: Aug. 31, 2007

(65) Prior Publication Data

US 2008/0055639 A1 Mar. 6, 2008

(30) Foreign Application Priority Data

Aug. 31, 2006 (JP) ................................. 2006-236754

(51) Int. Cl.
*G06K 15/00* (2006.01)
*G03G 15/00* (2006.01)

(52) U.S. Cl.
CPC .................................. *G03G 15/6573* (2013.01)
USPC ......... 358/1.14; 358/1.15; 358/1.12; 358/1.2; 399/82; 399/85; 399/403; 399/405; 270/58.11; 270/58.14; 270/58.18; 271/3.09; 271/3.13

(58) Field of Classification Search
None
See application file for complete search history.

(56) References Cited

U.S. PATENT DOCUMENTS

| | | | | |
|---|---|---|---|---|
| 5,081,595 | A * | 1/1992 | Moreno et al. | 358/1.12 |
| 5,659,846 | A * | 8/1997 | Yoshioka | 399/85 |
| 5,813,667 | A * | 9/1998 | Imai et al. | 270/58.14 |
| 6,807,383 | B2 * | 10/2004 | Kawagoe | 399/45 |
| 7,165,764 | B2 * | 1/2007 | Nakamura et al. | 270/58.11 |
| 7,207,557 | B2 * | 4/2007 | Kaneko et al. | 270/58.08 |
| 7,245,871 | B2 * | 7/2007 | Kasahara | 399/405 |
| 7,341,247 | B2 * | 3/2008 | Hirata et al. | 270/58.07 |
| 7,380,779 | B2 * | 6/2008 | Nakamura et al. | 270/58.25 |
| 7,386,246 | B2 * | 6/2008 | Yabe | 399/82 |
| 7,543,806 | B2 * | 6/2009 | Nakamura et al. | 270/58.11 |
| 2002/0012135 | A1 * | 1/2002 | Nagaso | 358/400 |
| 2002/0191997 | A1 * | 12/2002 | Matsumoto et al. | 399/404 |

(Continued)

FOREIGN PATENT DOCUMENTS

| | | | |
|---|---|---|---|
| JP | 10097113 | A | 4/1998 |
| JP | 2004-310746 | A | 11/2004 |
| JP | 2004-310747 | A | 11/2004 |
| JP | 2004306287 | A | 11/2004 |

OTHER PUBLICATIONS

JP Office Action issued Feb. 24, 2012 for corresponding JP2006-236754.

*Primary Examiner* — Hilina K Demeter
(74) *Attorney, Agent, or Firm* — Rossi, Kimms & McDowell LLP

(57) ABSTRACT

This invention relates to a printing system configured to output printing media having undergone print processing by a print apparatus to a plurality of destinations including a specific destination which has a structure allowing an operator to take out the printing media. In the system, output of printing media to the specific destination is restricted while the operator takes out the printing medium outputted to the specific destination, and in case that the number of printing media necessary for a job processed by the print apparatus is smaller than a predetermined number, the system is controlled not to output to the specific destination a printed material formed from printing media smaller in number than the predetermined number. This invention can achieve efficient printing by controlling not to stop the print operation of the system as much as possible.

9 Claims, 30 Drawing Sheets

(56) References Cited

U.S. PATENT DOCUMENTS

| | | | | |
|---|---|---|---|---|
| 2003/0044186 | A1* | 3/2003 | Kato et al. | 399/16 |
| 2003/0156850 | A1* | 8/2003 | Tsutada | 399/45 |
| 2003/0168796 | A1* | 9/2003 | Suzuki et al. | 270/58.07 |
| 2004/0027602 | A1* | 2/2004 | Kuboki | 358/1.13 |
| 2005/0220475 | A1* | 10/2005 | Kasahara | 399/82 |
| 2006/0007467 | A1* | 1/2006 | Tsunekawa | 358/1.13 |
| 2006/0034630 | A1* | 2/2006 | Yabe | 399/82 |
| 2006/0244208 | A1* | 11/2006 | Kubota et al. | 271/207 |
| 2007/0146789 | A1* | 6/2007 | Mima et al. | 358/1.16 |
| 2009/0059286 | A1* | 3/2009 | Yamaguchi | 358/1.15 |

* cited by examiner

PRINT CONTROL APPARATUS, METHOD THEREOF, AND MEDIUM STORING A PROGRAM, THAT CONTROL A PRINT PROCESSING BASED ON NUMBER OF SHEETS REQUIRED BY A PRINT JOB

BACKGROUND OF THE INVENTION

1. Field of the Invention

The present invention relates to a printing system, a print apparatus, and a job processing method thereof, and, more particularly, to a printing system and print apparatus capable of accepting a plurality of jobs, and a job processing method thereof.

2. Description of the Related Art

In a conventional printing industry, a publication is issued through various processes. These processes include entry of a document, designing of the document, layout editing, comprehensive layout (presentation by printing), proofreading (layout correction and color correction), proof (proof print), block copy preparation, printing, post-process, and shipping.

The commercial printing industry uses an offset reproduction printing press in the printing step, and the block copy preparation step is inevitable. However, once the block copy is prepared, it is difficult and disadvantageous in cost to correct it. In block copy preparation, therefore, careful proofreading (i.e., careful layout check and color confirmation) is indispensable. Some period of time is generally taken until a publication is issued.

Most of apparatuses used in respective processes are bulky and require expert knowledge, and know-how of experts is essential.

In this situation, a POD (Print On Demand) printing system using an electrophotographic or inkjet print apparatus has been proposed in recent years (see Japanese Patent Laid-Open Nos. 2004-310746 and 2004-310747).

The POD printing system eliminates the aforementioned block copy preparation and other complicated processes.

However, there is room to study on practical use of the POD printing system.

For example, a configuration with a dolly-attached finisher (stacker) is examined in the POD printing system on the assumption of handling of many jobs and the use of an offline post-processing apparatus. The stacker has a front door, the opening and closing thereof is restricted, depending on the situation, in order to stably discharge many jobs. When removing a printed material discharged inside the stacker, the operator must perform a series of operations to input an instruction with the front door open key of the stacker, move down the tray to the dolly, and open the front door.

The series of operations is done even when a small number of sheets are outputted to the stacker. Even if a small number of sheets are erroneously outputted to the stacker, the operator must wait for several dozen seconds for the series of operations to run its course before taking out the discharged sheets. The occurrence of such a circumstance may lead to downtime in the POD environment, a situation where efficiently processing a plurality of jobs at a high rate of productivity is crucial.

SUMMARY OF THE INVENTION

It is an object of the present invention to provide a printing system and print apparatus which efficiently print by controlling to keep the print operation of the printing system in constant operation as much as possible, and a job processing method thereof.

According to one aspect of the present invention, a printing system which is configured to output printing media having undergone print processing by a print apparatus to a plurality of destinations including a specific destination which has a structure allowing an operator to take out the printing media, the printing system comprises:

an output restriction unit adapted to restrict output of printing media to the specific destination while the operator takes out the printing media outputted to the specific destination; and an output control unit adapted to, in case that a number of printing media necessary for a job processed by the print apparatus is smaller than a predetermined number of media, control not to output to the specific destination a printed material formed from printing media smaller in number than the predetermined number of media.

According to another aspect of the present invention, a print apparatus which is configured to output printing media having undergone print processing in the print apparatus to a plurality of destinations including a specific destination which has a structure allowing an operator to take out the printing media, the apparatus comprises:

an output restriction unit adapted to restrict output of the printing media to the specific destination while the operator takes out the printing media outputted to the specific destination; and an output control unit adapted to, in case that a number of printing media necessary for a job processed by the print apparatus is smaller than a predetermined number of media, control not to output to the specific destination a printed material formed from printing media smaller in number than the predetermined number of media.

According to still another aspect of the present invention, a job processing method of outputting printing media having undergone print processing to a plurality of destinations including a specific destination which has a structure allowing an operator to take out the printing media, the method comprises the steps of:

restricting output of printing media to the specific destination while the operator takes out the printing medium outputted to the specific destination; and controlling not to output to the specific destination a printed material formed from printing media smaller in number than a predetermined number of media, in case that a number of printing media necessary for a job subjected to the print processing is smaller than the predetermined number of media.

According to yet another aspect of the present invention, a computer-readable storage medium which stores a program for causing a computer to execute a job processing method of outputting printing media having undergone print processing to a plurality of destinations including a specific destination which has a structure allowing an operator to take out the printing medium, the program comprises the steps of:

restricting output of printing media to the specific destination while the operator takes out the printing medium outputted to the specific destination; and controlling not to output to the specific destination a printed material formed from printing media smaller in number than a predetermined number of media, in case that a number of printing media necessary for a job subjected to the print processing is smaller than the predetermined number of media.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE EMBODIMENTS

[Example of Structure of a Printing System According to the Embodiment]

Figure 1:
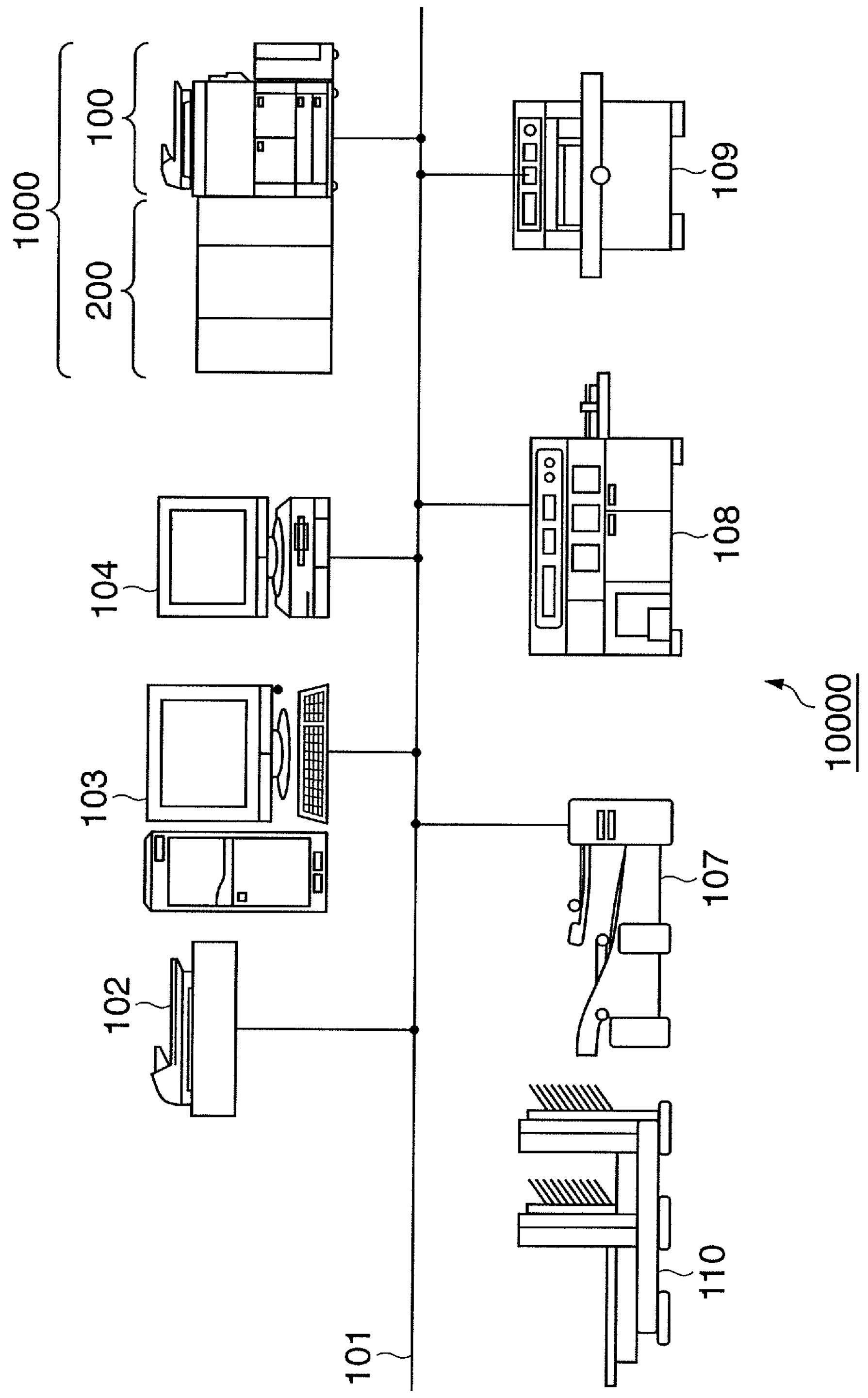
FIG. 1 is a view for explaining an overall POD system 10000.

A POD system 10000 in FIG. 1 comprises a printing system 1000, scanner 102, server computer 103 (PC 103), and client computer 104 (PC 104), which are connected to each other via a network 101. The POD system 10000 also comprises a paper folding apparatus 107, cutting apparatus 109, saddle stitching apparatus 110, case binding apparatus 108, and the like.

The printing system 1000 comprises a print apparatus 100 and sheet processing apparatus 200. As the print apparatus 100, the embodiment will exemplify an MFP (Multi Function Peripheral) having a plurality of functions such as the copy and printer functions. However, the print apparatus 100 may be a single function type print apparatus having only the copy or printer function.

The PC 103 manages data exchange with a variety of apparatuses connected to the network 101. The PC 104 transmits image data to the print apparatus 100 and PC 103 via the network 101. The paper folding apparatus 107 folds sheets printed by the print apparatus 100. The case binding apparatus 108 case-binds sheets printed by the print apparatus 100. The cutting apparatus 109 cuts each bundle of sheets printed by the print apparatus 100. The saddle stitching apparatus 110 saddle-stitches sheets printed by the print apparatus 100.

In the use of the paper folding apparatus 107, case binding apparatus 108, cutting apparatus 109, and saddle stitching apparatus 110, the user takes out sheets printed by the print apparatus 100 from the printing system 1000, sets them in an apparatus for use, and causes the apparatus to process them. A plurality of apparatuses in the POD system 10000 of FIG. 1 except for the saddle stitching apparatus 110 are connected to the network 101 so as to communicate data with each other.

The configuration of the printing system 1000 will be explained with reference to the system block diagram of FIG. 2.

Figure 2:
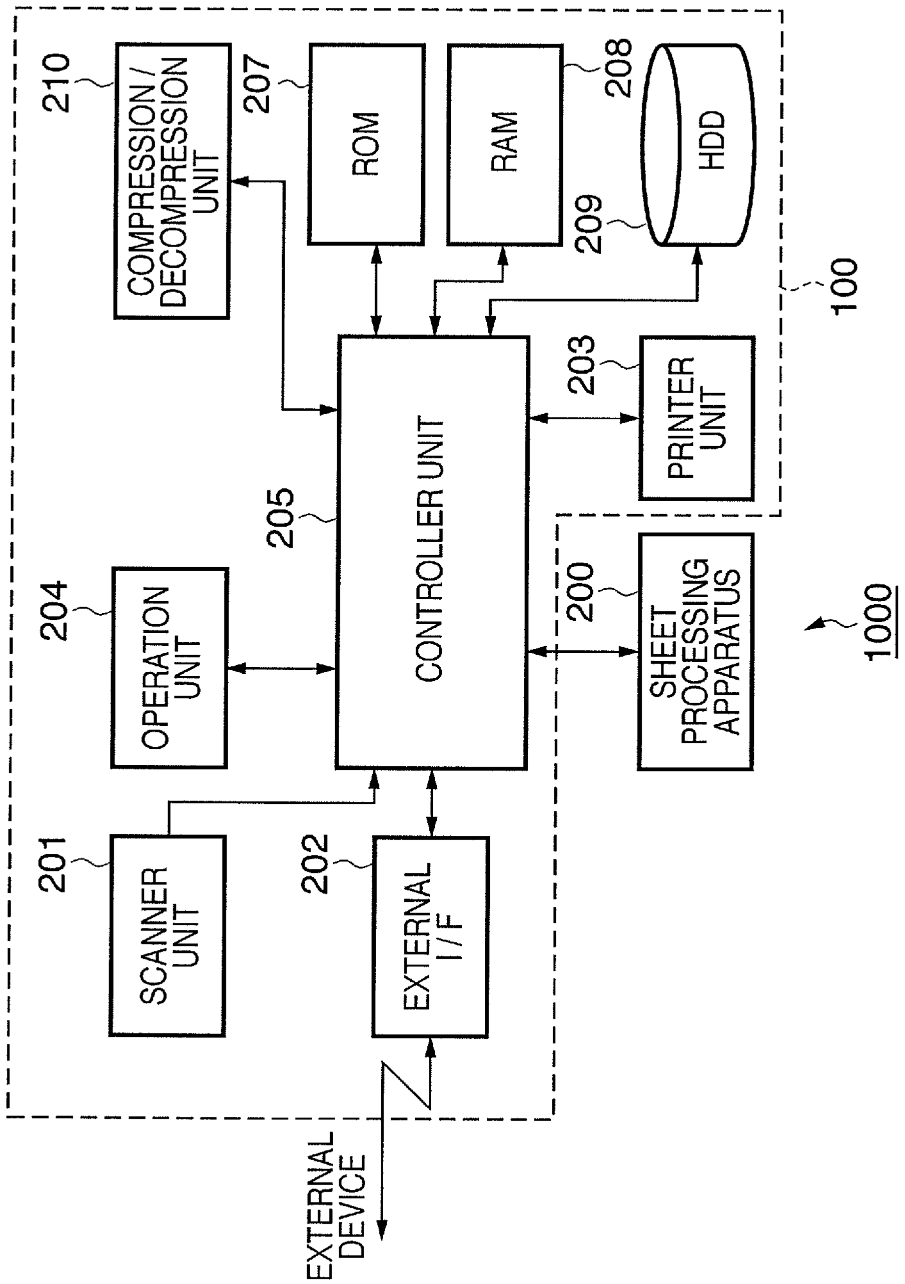
FIG. 2 is a block diagram for explaining an example of the internal configuration of a printing system 1000.

The print apparatus 100 incorporates units shown in FIG. 2 in the printing system 1000 except for the sheet processing apparatus 200. An arbitrary number of sheet processing apparatuses 200 are connectable to the print apparatus 100.

The printing system 1000 is configured so that the sheet processing apparatus 200 connected to the print apparatus 100 can execute sheet processing for sheets printed by the print apparatus 100. It is also possible to form the printing system 1000 from only the print apparatus 100 without connecting the sheet processing apparatus 200.

The sheet processing apparatus 200 can communicate with the print apparatus 100, and execute sheet processing (to be described later) upon receiving an instruction from the print apparatus 100. A scanner unit 201 scans an image on a document, converts the image into image data, and transfers the image data to another unit. An external I/F 202 exchanges data with other apparatuses connected to the network 101. A printer unit 203 prints an image based on input image data on a sheet. An operation unit 204 has a hard key input unit (key input unit) 402 and touch panel unit 401 (to be described later), and accepts an instruction from the user via them. The operation unit 204 provides various displays on its touch panel.

A control unit 205 comprehensively controls the processes and operations of various units and the like in the printing system 1000. The control unit 205 also controls the operation of the print apparatus 100 and that of the sheet processing apparatus 200 connected to the print apparatus 100. A ROM 207 stores various computer programs to be executed by the control unit 205. For example, the ROM 207 stores programs to cause the control unit 205 to execute various processes of flowcharts to be described later, and display control programs necessary to display various setup windows to be described later. The ROM 207 further stores a program to cause the control unit 205 to interpret PDL (Page Description Language) code data received from the PC 103, PC 104, or the like and expand the PDL code data into raster image data. In addition, the ROM 207 stores a boot sequence, font information, and the like. A RAN 208 stores image data sent from the scanner unit 201 and external I/F 202, various programs loaded from the ROM 207, and setting information. The RAM 208 also stores information on the sheet processing apparatus 200 (e.g., information on the number of (0 to n) sheet processing apparatuses 200 connected to the print apparatus 100, information on the function of each sheet processing apparatus 200, or the connection order of the sheet processing apparatuses 200).

An HDD (Hard Disk Drive) 209 includes a hard disk, and a drive unit which reads/writes data from/in the hard disk. The HDD 209 is a large-capacity storage device which stores image data input from the scanner unit 201 and external I/F 202 and compressed by a compression/decompression unit 210. The control unit 205 can cause the printer unit 203 to print image data stored in the HDD 209 on the basis of an instruction from the user. The control unit 205 can also transmit image data stored in the HDD 209 to an external apparatus such as the PC 103 via the external I/F 202 on the basis of an instruction from the user.

The compression/decompression unit 210 compresses/decompresses image data and the like stored in the RAM 208 and HDD 209 in accordance with various compression schemes such as JBIG and JPEG.

Figure 3:
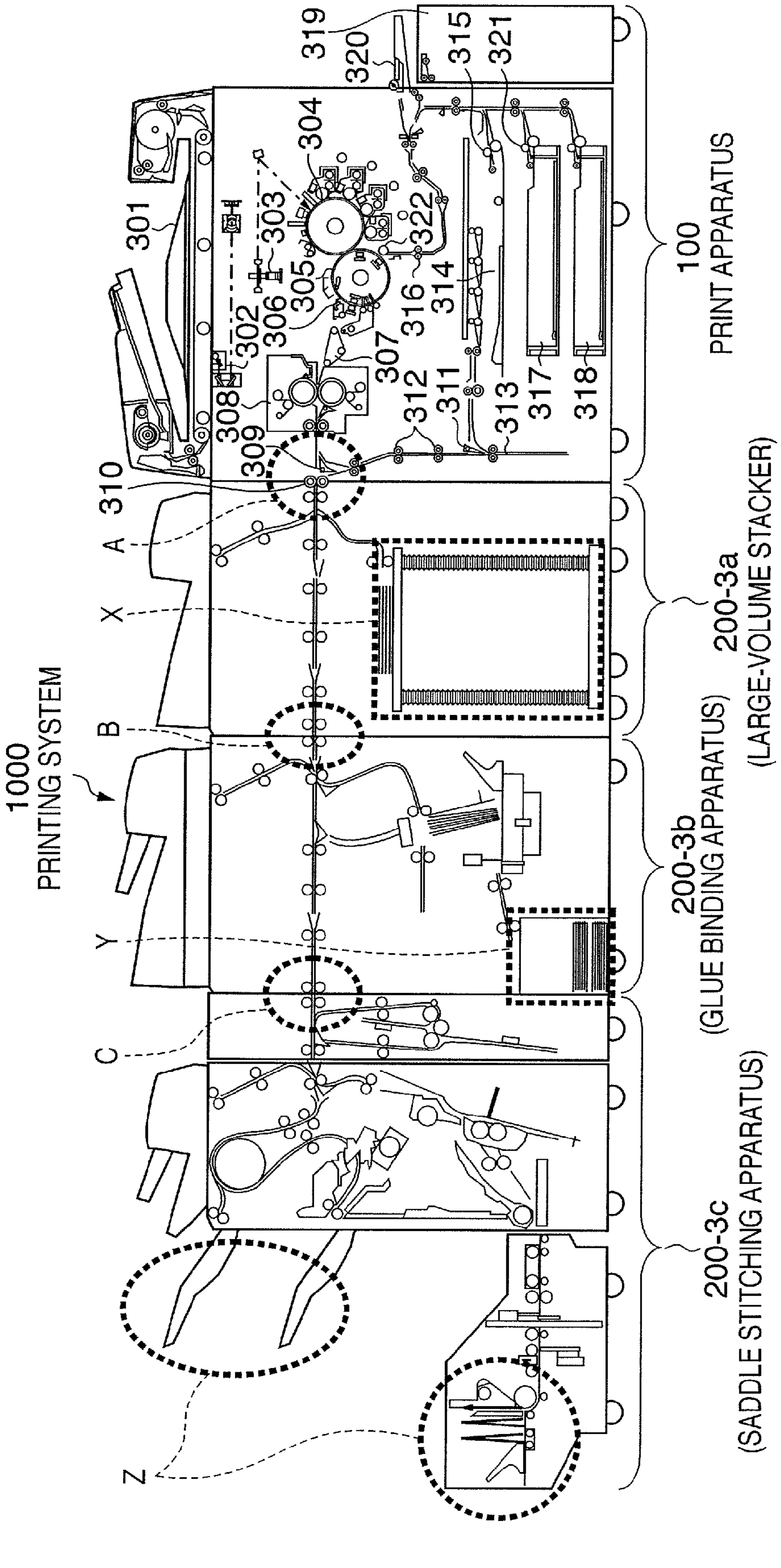
FIG. 3 is a sectional view for explaining an example of the configuration of the printing system 1000.

The configuration of the printing system 1000 will be explained with reference to FIG. 3. FIG. 3 is a sectional view of the print apparatus 100 and the sheet processing apparatus 200 connected to it.

An auto document feeder (ADF) 301 separates a document bundle on the support surface of the document tray sequentially in the order of pages from the first document sheet, and feeds each document sheet to the glass document table in order to scan the document sheet by a scanner 302.

The scanner 302 scans the image of the document sheet fed onto the glass document table, and converts the image into image data by a CCD. A rotary polygon mirror 303 receives a light ray (e.g., a laser beam) modulated in accordance with the image data, and irradiates a photosensitive drum 304 with the light ray as a reflected scan beam via a reflecting mirror. A latent image formed by the laser beam on the photosensitive drum 304 is developed with toner, and the toner image is transferred onto a sheet material on a transfer drum 305. A series of image forming processes are executed sequentially with yellow (Y), magenta (M), cyan (C), and black (K) toners, forming a full-color image. After four image forming processes, the sheet material bearing the full-color image is separated by a separation gripper 306 from the transfer drum 305, and conveyed to a fixing unit 308 by a pre-fixing conveyor 307. The fixing unit 308 has a combination of rollers and belts, and incorporates a heat source such as a halogen heater. The fixing unit 308 fuses and fixes, by heat and pressure, toner on a sheet material bearing a toner image. A delivery flapper 309 is swingable about the swing shaft, and regulates the sheet material conveyance direction. When the delivery flapper 309 swings clockwise in FIG. 3, a sheet material is conveyed straight, and discharged outside the apparatus by delivery rollers 310.

The control unit 205 controls the print apparatus 100 to execute single-sided printing according to this sequence.

To form images on the two surfaces of a sheet material, the delivery flapper 309 swings counterclockwise in FIG. 3, and the course of the sheet material changes downward to supply the sheet material to the double-sided conveyor. The double-sided conveyor has a reverse flapper 311, reverse rollers 312, a reverse guide 313, and a double-sided tray 314. The reverse flapper 311 swings about the swing shaft, and regulates the sheet material conveyance direction. To process a double-sided print job, the control unit 205 controls to swing the reverse flapper 311 counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314. The double-sided tray 314 temporarily supports the sheet material, and a refeed roller 315 supplies the sheet material again to registration rollers 316. At this time, the sheet material is sent while a surface opposite to the first surface in the transfer process faces the photosensitive drum. The second image is formed on the second surface of the sheet by the same process as that described above. After the images are formed on the two surfaces of the sheet material, the sheet undergoes the fixing process and is discharged outside from the main body of the print apparatus 100 via the delivery rollers 310. The control unit 205 controls the print apparatus 100 to execute double-sided printing according to this sequence.

The print apparatus 100 comprises a paper feed section which stores sheets necessary for print processing. The paper feed section has paper feed cassettes 317 and 318 (each capable of storing, e.g., 500 sheets), a paper feed deck 319 (capable of storing, e.g., 5,000 sheets), and a manual feed tray 320. The paper feed cassettes 317 and 318 and the paper feed deck 319 allow setting sheets of different sizes and materials discriminatively in the respective paper feed units. The manual feed tray 320 also allows setting various sheets including a special sheet such as an OHP sheet. The paper feed cassettes 317 and 318, the paper feed deck 319, and the manual feed tray 320 respectively have paper feed rollers, which successively feed sheets one by one.

The sheet processing apparatuses 200 shown in FIG. 3 will be explained.

In the printing system 1000 according to the embodiment, an arbitrary number of sheet processing apparatuses 200 of arbitrary types are connectable as long as they can convey a sheet from an upstream apparatus to a downstream apparatus via the sheet feeding path. For example, as shown in FIG. 3, a large-volume stacker 200-3*a*, glue binding apparatus 200-3*b*, and saddle stitching apparatus 200-3*c* are connected in the order named closer from the print apparatus 100, and selectively available in the printing system 1000. Each sheet processing apparatus 200 has a sheet discharge portion, and the user can take out a processed sheet from the sheet discharge portion of the sheet processing apparatus.

The control unit 205 accepts, together with a print execution request via the operation unit 204, a request to execute sheet processing of a type desired by the user among sheet processing candidates of types executable by the sheet processing apparatuses 200 connected to the print apparatus 100. Upon accepting a print execution request for a target job from the user via the operation unit 204, the control unit 205 causes the printer unit 203 to execute print processing necessary for the job. The control unit 205 controls to convey printed sheets of the job via the sheet feeding path to a sheet processing apparatus capable of executing sheet processing desired by the user. Then, the control unit 205 causes the sheet processing apparatus to execute the sheet processing.

Assume that a target job whose print execution request is accepted from the user requires large-volume stacking processing by the large-volume stacker 200-3*a* when the printing system 1000 has a system configuration shown in FIG. 3. This job is called a "stacker job".

When processing the stacker job in the system configuration of FIG. 3, the control unit 205 controls to convey sheets of the job printed by the print apparatus 100 into the large-volume stacker 200-3*a* via point A in FIG. 3. Then, the control unit 205 causes the large-volume stacker 200-3*a* to stack the sheets of the job. The control unit 205 causes the large-volume stacker 200-3*a* to hold the printed materials of the job stacked in the large-volume stacker 200-3*a* at delivery destination X inside the large-volume stacker 200-3*a* without conveying them to another apparatus (e.g., a succeeding apparatus).

The user can directly take out, from delivery destination X, the printed materials of the stacker job held at delivery destination X in FIG. 3. This can omit a series of apparatus operations and user operations to convey sheets to the most downstream delivery destination Z in the sheet conveyance direction in FIG. 3 and take out the printed materials of the stacker job from delivery destination Z.

Assume that a target job whose print execution request is accepted from the user requires sheet processing (e.g., either glue binding of case binding and pad binding) by the glue binding apparatus 200-3*b* in the system configuration of FIG. 3. This job is called a "glue binding job".

When processing the glue binding job in the system configuration of FIG. 3, the control unit 205 controls to convey sheets printed by the print apparatus 100 into the glue binding apparatus 200-3*b* via points A and B in FIG. 3. Then, the control unit 205 causes the glue binding apparatus 200-3*b* to bind the sheets of the job with glue. The control unit 205 causes the glue binding apparatus 200-3*b* to hold the printed materials of the job glue-bound by the glue binding apparatus 200-3*b* at delivery destination Y inside the glue binding apparatus 200-3*b* without conveying them to another apparatus (e.g., a succeeding apparatus).

Assume that a target job whose print execution request is accepted from the user requires sheet processing by the saddle stitching apparatus 200-3*c* in the system configuration of FIG. 3. The sheet processing by the saddle stitching apparatus 200-3*c* includes, e.g., saddle stitching, punching, cutting, shift delivery, and folding. This job is called a "saddle stitching job".

When processing the saddle stitching job by the system configuration in FIG. 3, the control unit 205 controls to convey sheets of the job printed by the print apparatus 100 into the saddle stitching apparatus 200-3*c* via points A, B, and C. Then, the control unit 205 causes the saddle stitching apparatus 200-3*c* to process the sheets of the job. The control unit 205 causes the saddle stitching apparatus 200-3*c* to hold the printed materials of its saddle stitching job at delivery destination Z in the saddle stitching apparatus 200-3*c*.

Delivery destination Z has a plurality of delivery destination candidates. This is because the saddle stitching apparatus 200-3*c* can execute a plurality of types of sheet processes and the delivery destination changes in each sheet process.

As described with reference to FIGS. 1 to 3, the printing system 1000 according to the embodiment allows connecting a plurality of sheet processing apparatuses to the print apparatus 100. These sheet processing apparatuses can be arbitrarily combined and connected to the print apparatus 100. The connection order of the sheet processing apparatuses can be freely changed as long as the sheet feeding paths of the apparatuses link with each other. There are a plurality of types of sheet processing apparatus candidates connectable to the print apparatus 100.

The internal structures of the sheet processing apparatuses 200 connectable to the print apparatus 100 will be explained for each type with reference to FIGS. 4 to 6.

The internal structure of the large-volume stacker applicable as the sheet processing apparatus 200 will be explained with reference to the sectional view shown in FIG. 4. The large-volume stacker conveys a sheet from an upstream apparatus selectively to one of three feeding paths: a sample tray path, stack path, and straight path.

The stack path in the large-volume stacker is a sheet feeding path for conveying sheets to the stack tray. The stack tray in FIG. 4 is a stacking unit mounted on an extensible stay. A demountable truck supports the extensible stay from below it. With the truck, the operator can carry sheets stacked on the stack tray.

Assume that the control unit 205 accepts a request from the user via the operation unit 204 to execute a job set to perform sheet stacking processing by the large-volume stacker. In this case, the control unit 205 conveys sheets printed by the print apparatus 100 to the stack path of the large-volume stacker, and delivers them to the stack tray via the stack path.

Figure 4:
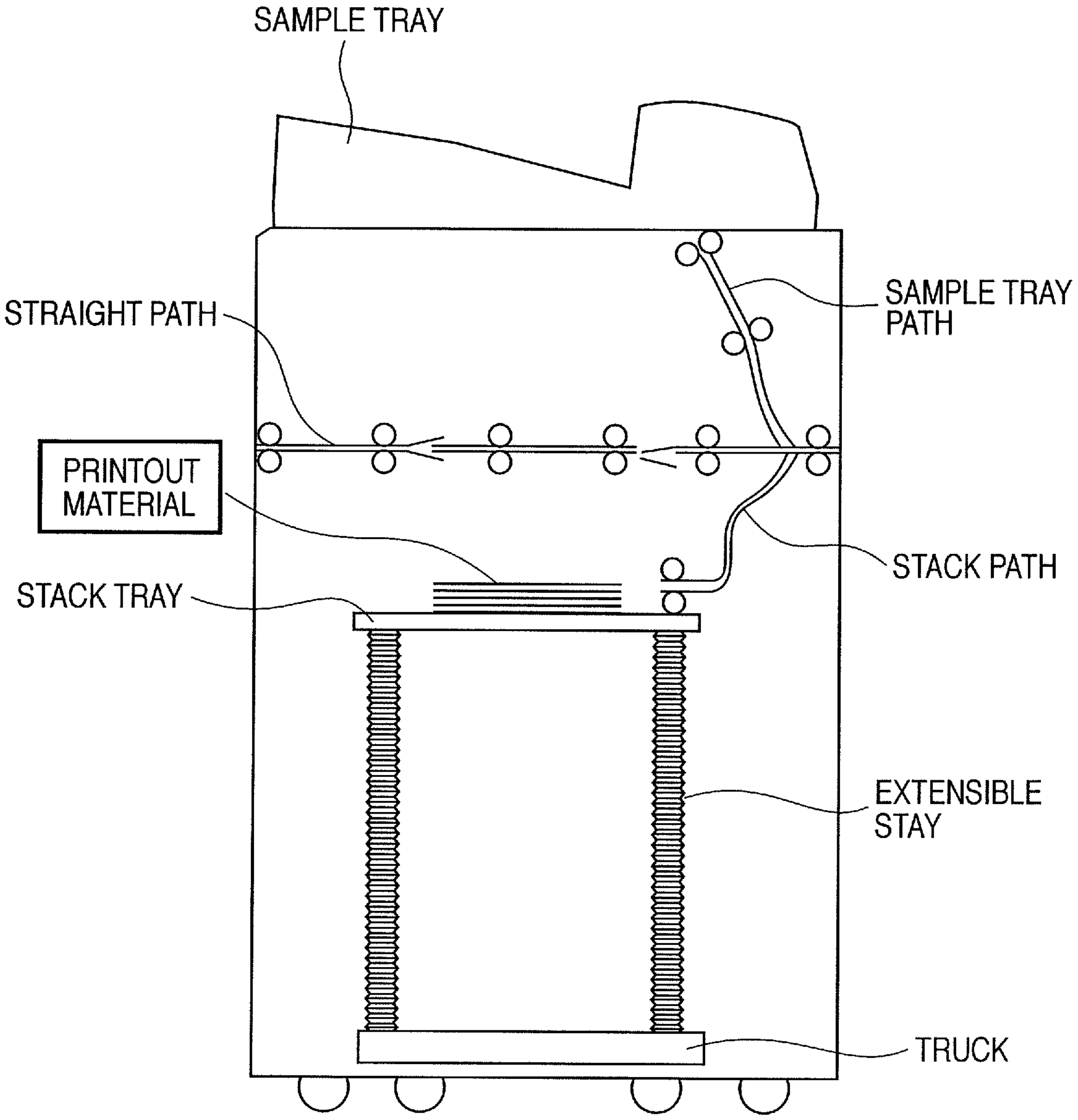
FIG. 4 is a sectional view showing an example of the internal structure of a large-volume stacker.

The straight path of the large-volume stacker shown in FIG. 4 is a sheet feeding path for conveying, to a succeeding apparatus, sheets of a job requiring no sheet stacking processing using the stack tray of the large-volume stacker.

The sample tray path is a sheet feeding path for discharging sheets to the sample tray. The sample tray path is used to easily take out an output material from the stack tray when performing, e.g., work requiring a check on an output. In this case, for example, the control unit 205 causes the large-volume stacker to convey sheets printed by the print apparatus 100 to the sample tray path, and discharge them onto the sample tray.

A plurality of sheet sensors necessary to detect the sheet conveyance status and jam are arranged on the sheet feeding path in the large-volume stacker.

The CPU (not shown) of the large-volume stacker notifies the control unit 205 of sheet detection information from each sensor via a signal line for data communication. Based on the information from the large-volume stacker, the control unit 205 grasps the sheet conveyance status and jam in the large-volume stacker. When another sheet processing apparatus is connected between the large-volume stacker and the print apparatus 100, the CPU (not shown) of the sheet processing apparatus notifies the control unit 205 of sensor information of the large-volume stacker.

The internal structure of the glue binding apparatus will be explained with reference to the sectional view shown in FIG. 5.

The glue binding apparatus conveys a sheet from an upstream apparatus selectively to one of three feeding paths: a cover path, main body path, and straight path. The glue binding apparatus also has an inserter path. The inserter path is a sheet feeding path for conveying a sheet on the insertion tray to the cover path.

Figure 5:
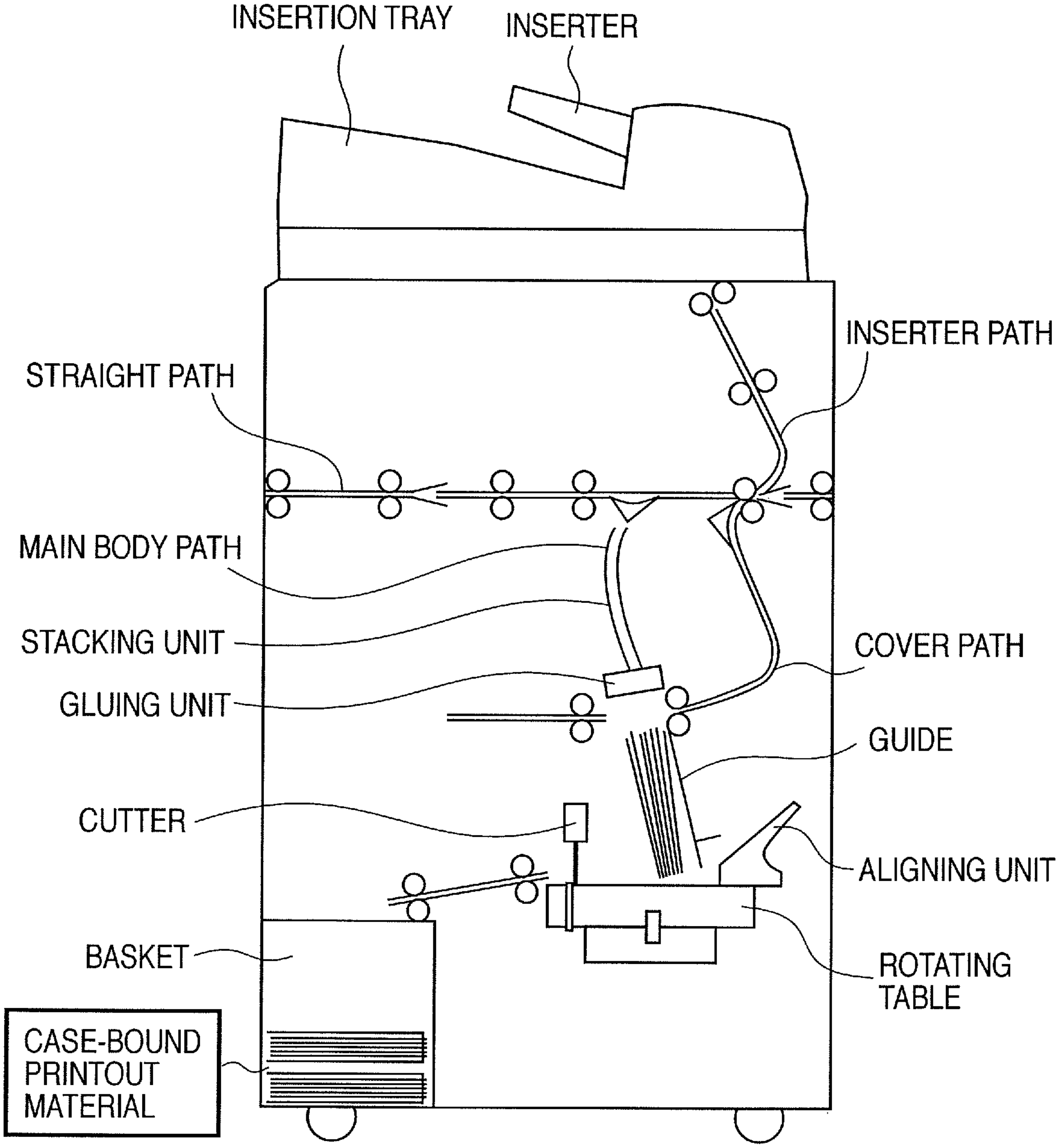
FIG. 5 is a sectional view showing an example of the internal structure of a glue binding apparatus.

The straight path of the glue binding apparatus in FIG. 5 is a sheet feeding path for conveying, to a succeeding apparatus, sheets of a job requiring no glue binding by the glue binding apparatus.

The main body path and cover path of the glue binding apparatus shown in FIG. 5 are sheet feeding paths for conveying sheets necessary to create case-bound printed materials.

For example, when creating case-bound printed materials using the glue binding apparatus, the control unit 205 causes the printer unit 203 to print image data of the body on sheets serving as the body of the case-bound printed materials. Case-bound printed materials of one booklet are created by wrapping a bundle of body sheets for one booklet with one cover. The body sheet bundle in case binding will be called a "main body".

The control unit 205 controls to convey sheets printed by the print apparatus 100 to the main body path shown in FIG. 5. In case binding, the control unit 205 causes the glue binding apparatus to wrap the main body printed by the print apparatus 100 with a cover sheet conveyed via the cover path.

For example, the control unit 205 causes the glue binding apparatus to sequentially stack main body sheets conveyed from an upstream apparatus on the stacking unit via the main body path in FIG. 5. After stacking sheets bearing body data on the stacking unit by the number of sheets of one booklet, the control unit 205 controls to convey one cover sheet necessary for the job via the cover path. The control unit 205 controls a gluing unit in FIG. 5 to glue the spine of the sheet bundle of one set corresponding to the main body. Then, the control unit 205 controls the gluing unit to bond the spine of the main body to the center of the cover. In bonding the main body to the cover, the main body is conveyed and pushed down in the apparatus. As a result, the cover is folded to wrap the main body with one cover. The sheet bundle of one set is stacked on a rotating table in FIG. 5 along the guide.

After the sheet bundle of one set is set on the rotating table in FIG. 5, the control unit 205 causes a cutter in FIG. 5 to cut the sheet bundle. At this time, the cutter can execute three-side cutting processing to cut three edges of the sheet bundle of one set other than an edge serving as the spine.

The control unit 205 uses an aligning unit to push the sheet bundle having undergone three-side cutting processing toward a basket, putting the sheet bundle into the basket.

The internal structure of the saddle stitching apparatus will be explained with reference to the sectional view shown in FIG. 6.

The saddle stitching apparatus comprises various units for selectively executing stapling, cutting, punching, folding, shift delivery, saddle stitching, and the like for sheets from the print apparatus 100. The saddle stitching apparatus does not have a straight path for conveying sheets to a succeeding apparatus. For this reason, the saddle stitching apparatus is connected last, as shown in FIG. 3, when connecting a plurality of sheet processing apparatuses to the print apparatus 100.

Figure 6:
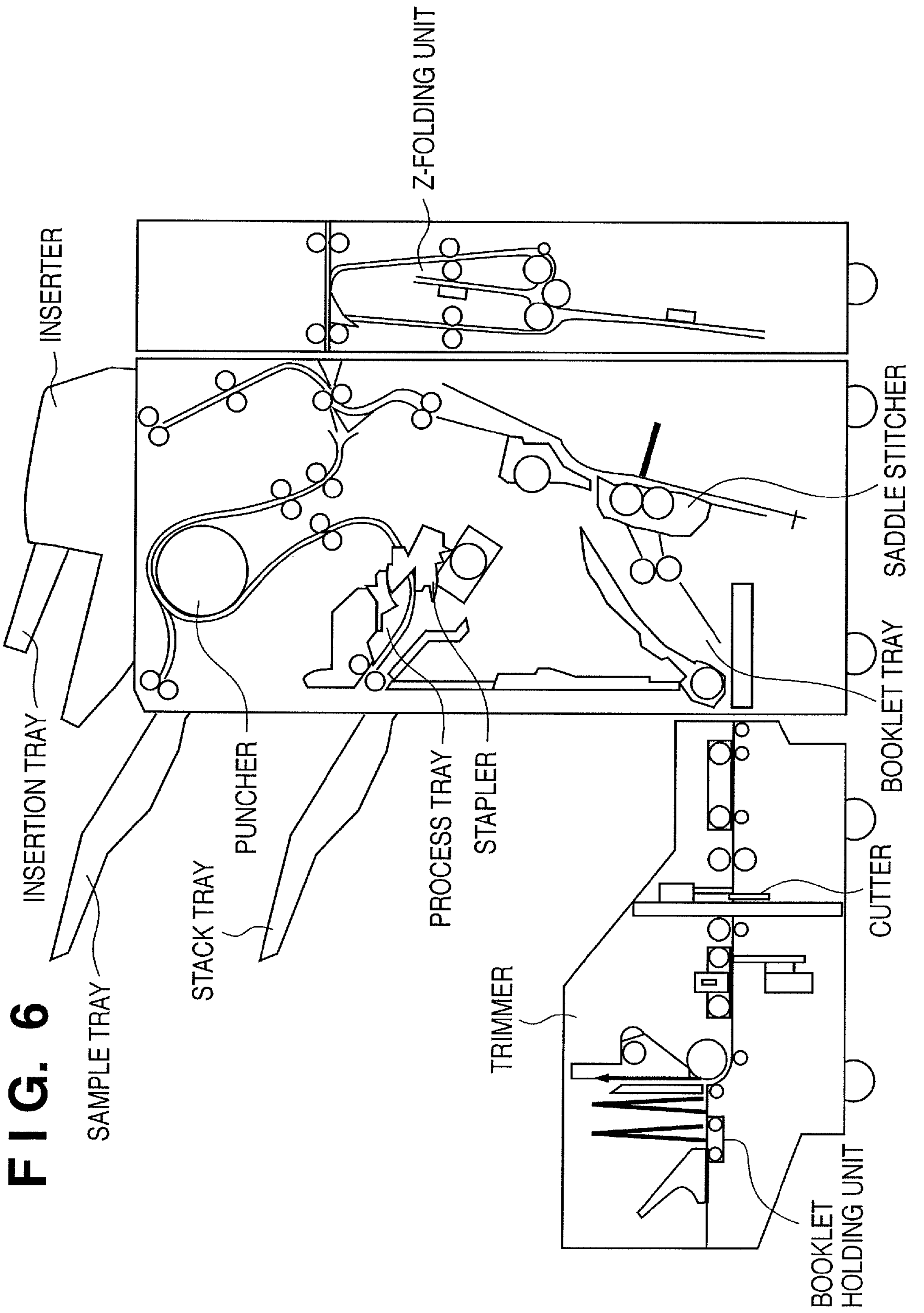
FIG. 6 is a sectional view showing an example of the internal structure of a saddle stitching apparatus.

As shown in FIG. 6, the saddle stitching apparatus has a sample tray and stack tray outside the apparatus, and a booklet tray inside the apparatus.

Upon accepting an instruction to staple sheets by the saddle stitching apparatus, the control unit 205 causes the saddle stitching apparatus to sequentially stack sheets printed by the print apparatus 100 on the process tray inside the saddle stitching apparatus. After stacking sheets of one bundle on the process tray, the control unit 205 causes a stapler to staple them. The control unit 205 causes the saddle stitching apparatus to discharge the stapled sheet bundle from the process tray to the stack tray in FIG. 6.

When executing a job for which the control unit 205 accepts an instruction to Z-fold sheets by the saddle stitching apparatus, the control unit 205 causes a Z-folding unit to Z-fold sheets printed by the print apparatus 100. The control unit 205 controls to make the folded sheets pass through the saddle stitching apparatus and deliver them onto a discharge tray such as the stack tray or sample tray.

Upon accepting an instruction to perform punching by the saddle stitching apparatus, the control unit 205 causes a puncher to punch sheets printed by the print apparatus 100. The control unit 205 controls to make the punched sheets pass through the saddle stitching apparatus and deliver them onto a discharge tray such as the stack tray or sample tray.

When executing a job for which the control unit 205 accepts an instruction to saddle-stitch sheets by the saddle stitching apparatus, the control unit 205 causes a saddle stitcher to stitch a bundle of sheets by one set at two center portions. The control unit 205 causes the saddle stitcher to clamp the sheet bundle at the center by rollers and fold the sheets into two at the center, thereby creating a booklet such as a brochure. The sheet bundle saddle-stitched by the saddle stitcher is conveyed onto the booklet tray.

Upon accepting a cutting instruction for a job for which the control unit 205 accepts an instruction to saddle-stitch sheets, the control unit 205 controls to convey a saddle-stitched sheet bundle from the booklet tray to a trimmer. The control unit 205 causes a cutter to cut the sheet bundle conveyed to the trimmer, and a booklet holding unit to hold the sheet bundle. The saddle stitching apparatus in FIG. 6 can also cut three edges of a saddle-stitched sheet bundle.

When the saddle stitching apparatus does not have any trimmer, the user can take out a sheet bundle bound by the saddle stitcher from the booklet tray.

The saddle stitching apparatus can also attach a sheet (e.g., a cover sheet printed in advance) set on the insertion tray in FIG. 6 to a sheet (printed by the print apparatus 100) conveyed from the print apparatus 100.

Figure 7:
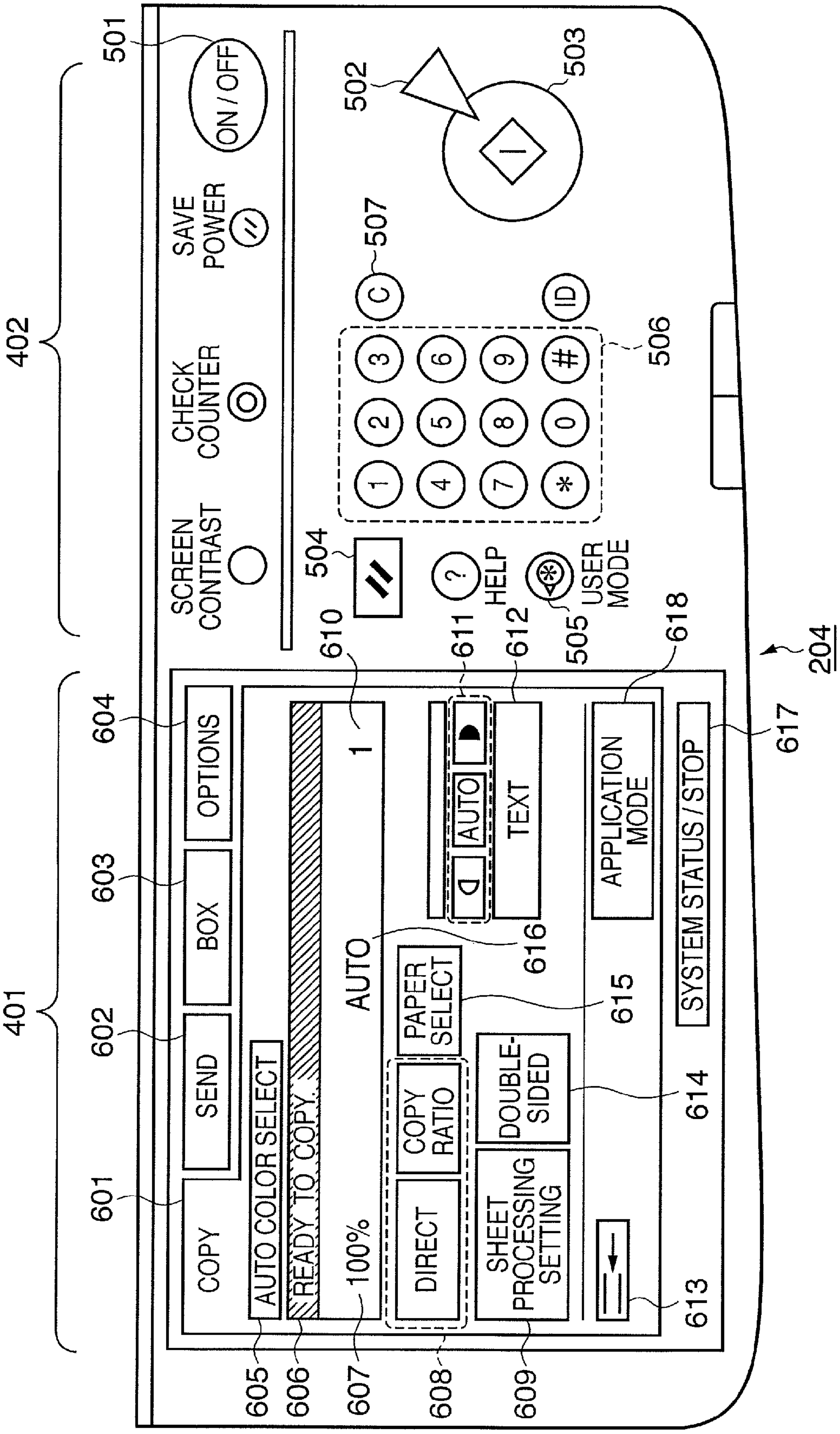
FIG. 7 is a view showing an example of an operation unit 204.

The arrangement of the operation unit 204 will be described with reference to FIG. 7.

The operation unit 204 comprises the touch panel unit 401 and key input unit 402. The touch panel unit 401 is formed from an LCD (Liquid Crystal Display) and a transparent electrode adhered onto the LCD, and displays various setup windows for accepting an instruction from the user. The touch panel unit 401 has both a function of displaying various windows and an instruction input function of accepting an instruction from the user. The key input unit 402 comprises a power key 501, start key 503, stop key 502, user mode key 505, and ten-key pad 506. The start key 503 is used to cause the print apparatus 100 to execute a copy job and send job. The ten-key pad 506 is used to set a numerical value such as the number of copies.

The control unit 205 controls the printing system 1000 to perform various processes based on user instructions accepted via various windows displayed on the touch panel unit 401 and user instructions accepted via the key input unit 402.

Figure 8:
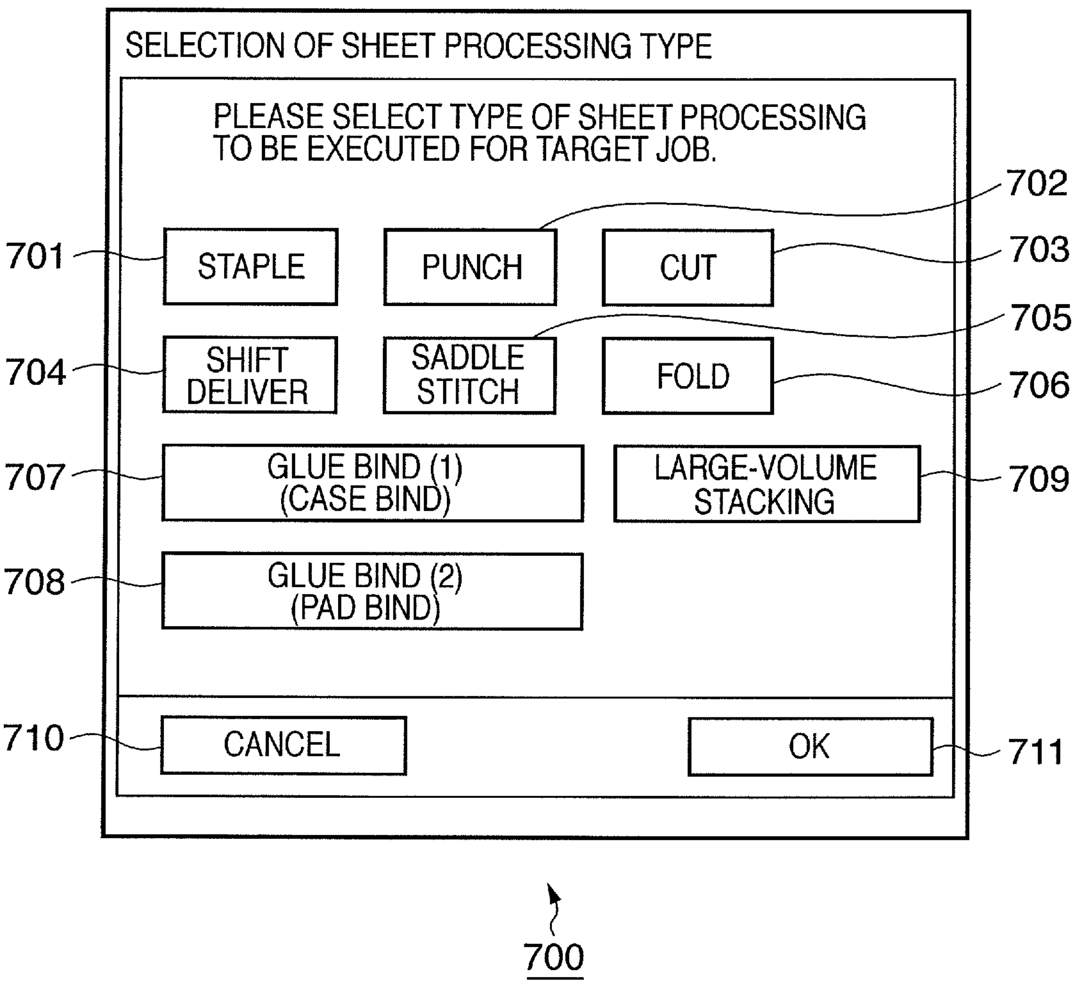
FIG. 8 is a view showing an example of a user interface window.

FIG. 8 is a view showing a display example of a setup window for prompting the user to select the type of sheet processing to be executed for sheets printed by the print apparatus 100. When the user presses a sheet processing setting key 609 shown in FIG. 7 in the window displayed on the touch panel unit 401, the control unit 205 causes the touch panel unit 401 to display the window in FIG. 8. The window in FIG. 8 is a setup window which allows the user to select the type of sheet processing executable by the sheet processing apparatus 200 in the printing system 1000. The control unit 205 accepts, from the user via the window in FIG. 8, settings of sheet processing to be executed for a target job, and causes the sheet processing apparatus 200 to execute the sheet processing according to the settings.

Figure 9:
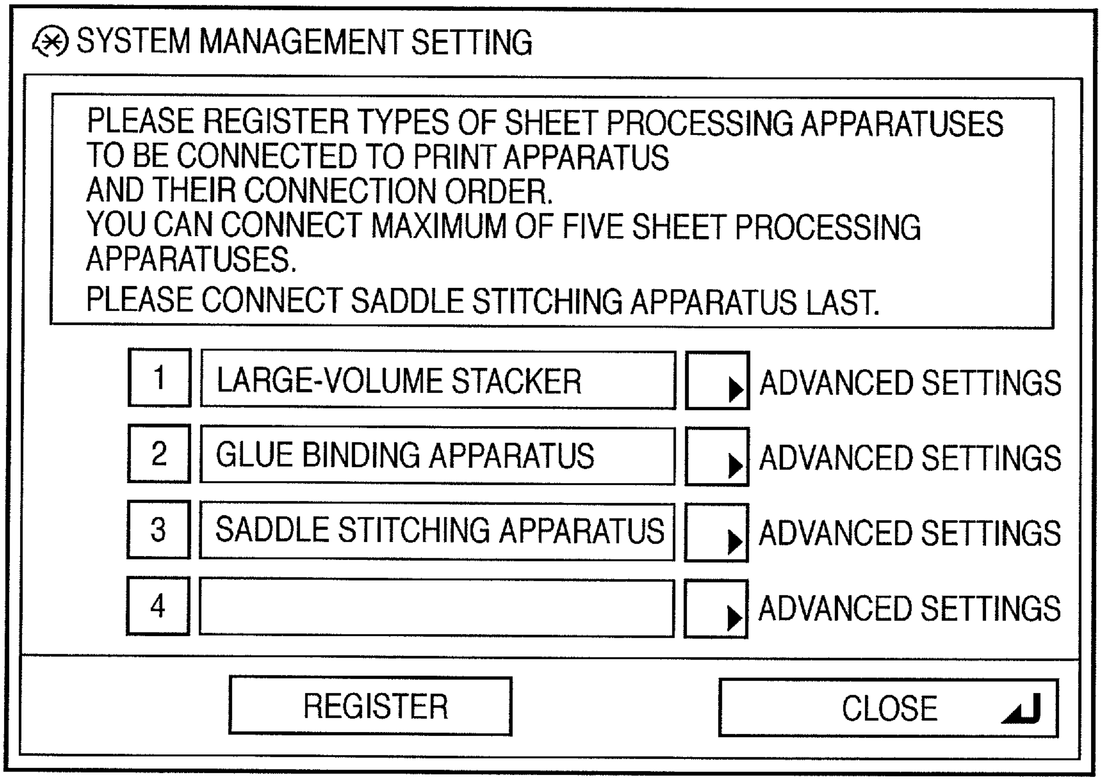
FIG. 9 is a view showing an example of a user interface window.

A window shown in FIG. 9 is a setup window which allows the user to register information for specifying the number, types, and connection order of sheet processing apparatuses connected to the print apparatus 100 in the case where the sheet processing apparatuses 200 are connected to the print apparatus 100. When the user presses the user mode key 505, the control unit 205 controls the touch panel unit 401 to display the window shown in FIG. 9.

For example, when the printing system 1000 has the system configuration as shown in FIG. 3, the user sets registration information that three sheet processing apparatuses, i.e., the large-volume stacker, glue binding apparatus, and saddle stitching apparatus are connected to the print apparatus 100 sequentially from the large-volume stacker, as shown in FIG. 9. The control unit 205 causes the RAM 208 to hold, as system configuration information, the information on the sheet processing apparatuses 200 that is set by the user via the window in FIG. 9. The control unit 205 properly reads out and refers to the system configuration information. From the system configuration information, the control unit 205 confirms the number, types, and connection order of sheet processing apparatuses connected to the print apparatus 100.

Assume that the user makes a setting in the window of FIG. 9 to connect the saddle stitching apparatus having no straight path between sheet processing apparatuses. In this case, the control unit 205 causes the touch panel unit 401 to present an error display and notify the user that the setting is invalid. Further, as shown in FIG. 9, the control unit 205 causes the touch panel unit 401 to display guidance information and notify the user of canceling this setting and connecting the saddle stitching apparatus last.

Figure 10:
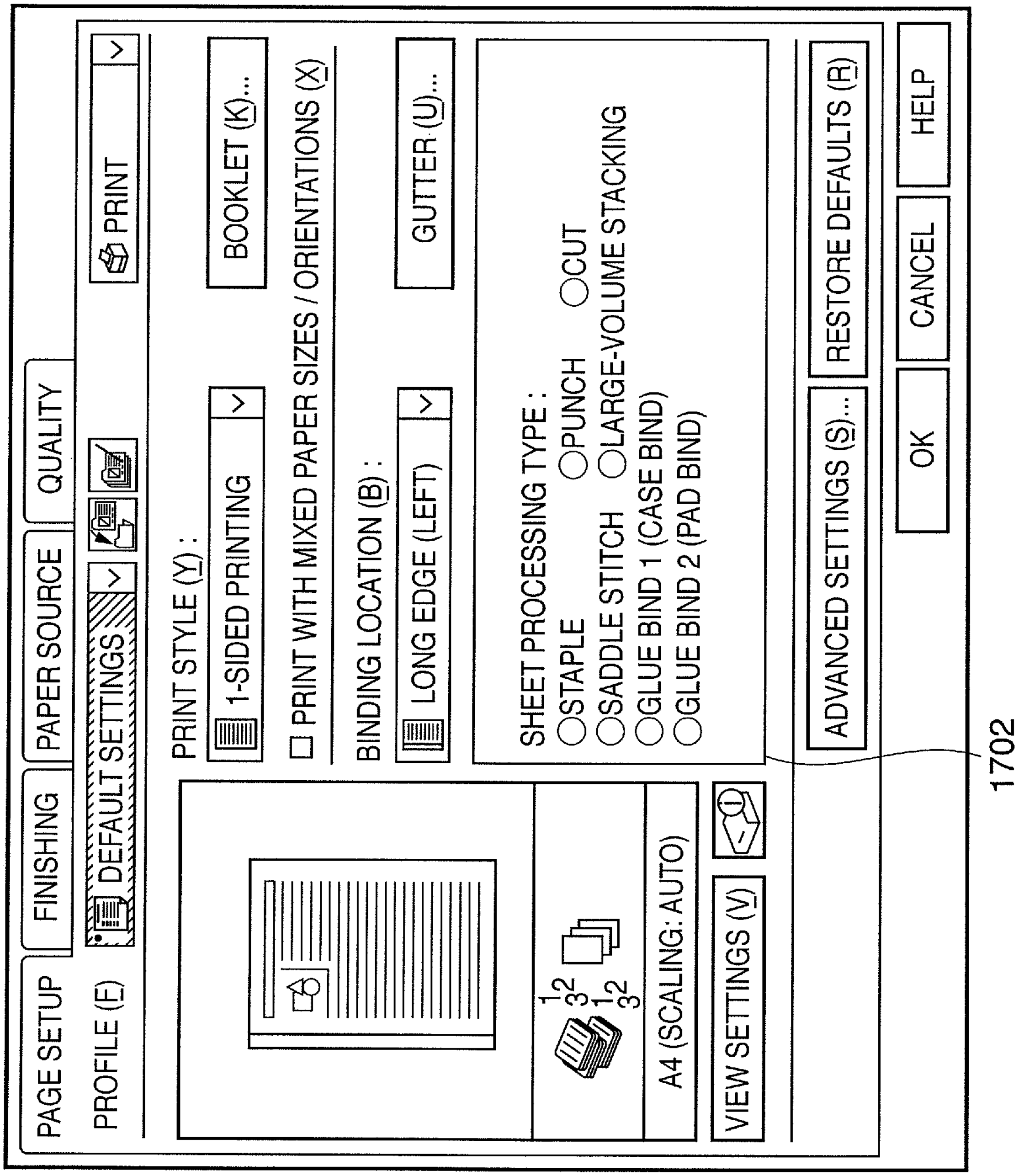
FIG. 10 is a view showing an example of a user interface window.

The embodiment exemplifies the operation unit 204 of the print apparatus 100 as an example of a user interface unit applied to the printing system 1000, but another user interface unit is also available. For example, the printing system 1000 may execute processing based on an instruction from the user interface unit of an external apparatus such as the PC 103 or PC 104. When the external apparatus remote-controls the printing system 1000, the display unit of the external apparatus displays a setup window relevant to the printing system 1000, as shown in FIG. 10. This will be exemplified using the PC 104. FIG. 10 shows an example of a window on the display of the PC 104.

Upon accepting a print request from the user, the CPU of the PC 104 causes the display to present the window as shown in FIG. 10. The CPU accepts the settings of print processing conditions from the user of the PC 104 via the window. For example, the CPU of the PC 104 accepts, from the user via a setting field 1702, the type of sheet processing to be executed by the sheet processing apparatus 200 for a print job subjected to a print execution request. Upon accepting the print execution request in response to a press of an OK key in FIG. 10, the CPU of the PC 104 associates the print processing conditions accepted via the window with image data to be printed. The CPU of the PC 104 controls to transmit the resultant data as one job to the printing system 1000 via the network 101.

In the printing system 1000, the control unit 205 accepts the print execution request of the job via the external I/F 202. Then, the control unit 205 controls the printing system 1000 to process the job from the PC 104 on the basis of the print processing conditions from the PC 104.

In this manner, various units are available as the user interface of the printing system 1000.

[Example of Processing to Prevent Print Stop by Large-Volume Stacker or the Like According to the Embodiment]

Before a description of concrete control, the configuration of the printing system 1000 will be complemented.

A variety of inline finishers such as the large-volume stacker according to the embodiment each have a door (front door) on the front surface of the housing, which may be opened and closed. The front door allows the operator to remove a paper jam from each finisher or take out the printed materials (also called printing media) of a job printed by the printer unit 203.

For example, the large-volume stacker according to the embodiment comprises a stack tray inside the stacker that can stack many printed materials, and an escape tray outside the stacker (at the top of the stacker), as illustrated in the internal structure of FIG. 4. The stack tray is also called a stacker unit, and the escape tray is also called a sample tray.

The control unit 205 controls to selectively supply the printed materials of a target job to respective trays such as the stack tray inside the large-volume stacker and the escape tray outside it in the embodiment on the basis of various criteria according to the embodiment. Each inline finisher, such as the large-volume stacker according to the embodiment, except for the saddle stitching apparatus, also has a function of conveying a printed material received from a preceding apparatus into a succeeding inline finisher via the internal through path of the inline finisher. The large-volume stacker according to the embodiment is configured such that the tray can automatically move down in accordance with the sheet stacking amount of printed materials on the internal stack tray. The large-volume stacker can also align printed materials.

The structure is as described with reference to FIG. 4. The large-volume stacker has a front door on its front surface, which may be opened and closed by the operator. The large-volume stacker also has, at the top of the housing, a switch for allowing the operator to input an instruction to open the door. The control unit (not shown) of the large-volume stacker mainly controls a plurality of operations in the large-volume stacker. The stacker control unit opens the door in accordance with an instruction manually input by the operator via the switch. More specifically, the door is locked with a key (not shown) when closed. The operator unlocks the key to open the door, and can take out printed materials stacked on the stack tray of the large-volume stacker.

The present invention is also controlled to automatically open the door in accordance with an instruction from the control unit 205 of the print apparatus 100, in addition to an operation via the switch. In such a circumstance, the control unit 205 transmits a door open signal to the control unit of the large-volume stacker, via a signal line inside the print apparatus 100 shown in FIG. 2. The operator opens the door to take out printed materials stacked on the stack tray of the large-volume stacker. The control unit 205 of the print apparatus 100 may also execute the control operations.

According to the embodiment, when the operator is removing the printed materials of a print job from the large-volume stacker, the present invention is controlled so as not to deliver the sheets of a subsequent job, print execution of which is requested after the printed job, to the stack tray of the large-volume stacker. The control unit 205 of the printing system 1000 mainly performs the control thereof.

In other words, the control unit 205 of the printing system 1000 according to the embodiment instructs the sheet processor of the sheet processing apparatus not to deliver the sheets of a job subsequent to a target job while the operator takes out printed materials from the sheet processing apparatus.

However, the control unit 205 controls the execution of, e.g., the following exemplary operations, even while the operator takes out printed materials from the stack tray of the large-volume stacker.

For example, the control unit 205 controls the delivery of the printed materials of a subsequent job to the escape tray of the large-volume stacker while, for example, the operator takes out printed materials stacked on the stack tray and the front door of the large-volume stacker is open.

Also, the control unit 205 controls to convey, via the through path inside the large-volume stacker, the printed materials of a subsequent job which meets the following conditions, while the front door of the large-volume stacker is kept open, as described above. The subsequent job which meets the following conditions is a job requiring no stacking processing by the large-volume stacker, and a job requiring finishing by an inline finisher connected downstream of the large-volume stacker.

As described above, the control unit 205 permits execution of these exemplary operations in the system 1000 even while the door is kept open.

In order to execute these operations, the control unit 205 inhibits or permits the start of the print operation of a subsequent job, print execution of which is requested after a job whose sheets are taken out by the operator from the sheet processing apparatus. In other words, the control unit 205 controls whether to permit/inhibit execution of the print operation of the subsequent job, and the print timing.

This configuration is also unique to an inline finisher physically and electrically connected to the print apparatus.

Various control operations executed for the printing system 1000 by the control unit 205 serving as an example of the control unit of the embodiment will be described.

The printing system 1000 comprises the print apparatus 100 having the printer unit 203 capable of executing print processing of data in the HDD 209 capable of storing data of jobs. The printing system 1000 is configured to connect the print apparatus 100 and a plurality of sheet processing apparatuses 200. Each of the sheet processing apparatuses 200 connectable to the print apparatus 100 can execute sheet processing (also called finishing or post-processing) for sheets (also called printed materials or print media) of a job printed by the printer unit 203. Each sheet processing apparatus 200 allows the operator to take out a printed material having undergone sheet processing by the apparatus 200. The printing system 1000 according to the embodiment can selectively supply job sheets printed by the printer unit 203 from the printer unit 203 to the sheet processing apparatuses 200.

[Exemplary Structure of Memory Used for Job Processing Method According to the Embodiment]

Figure 11:
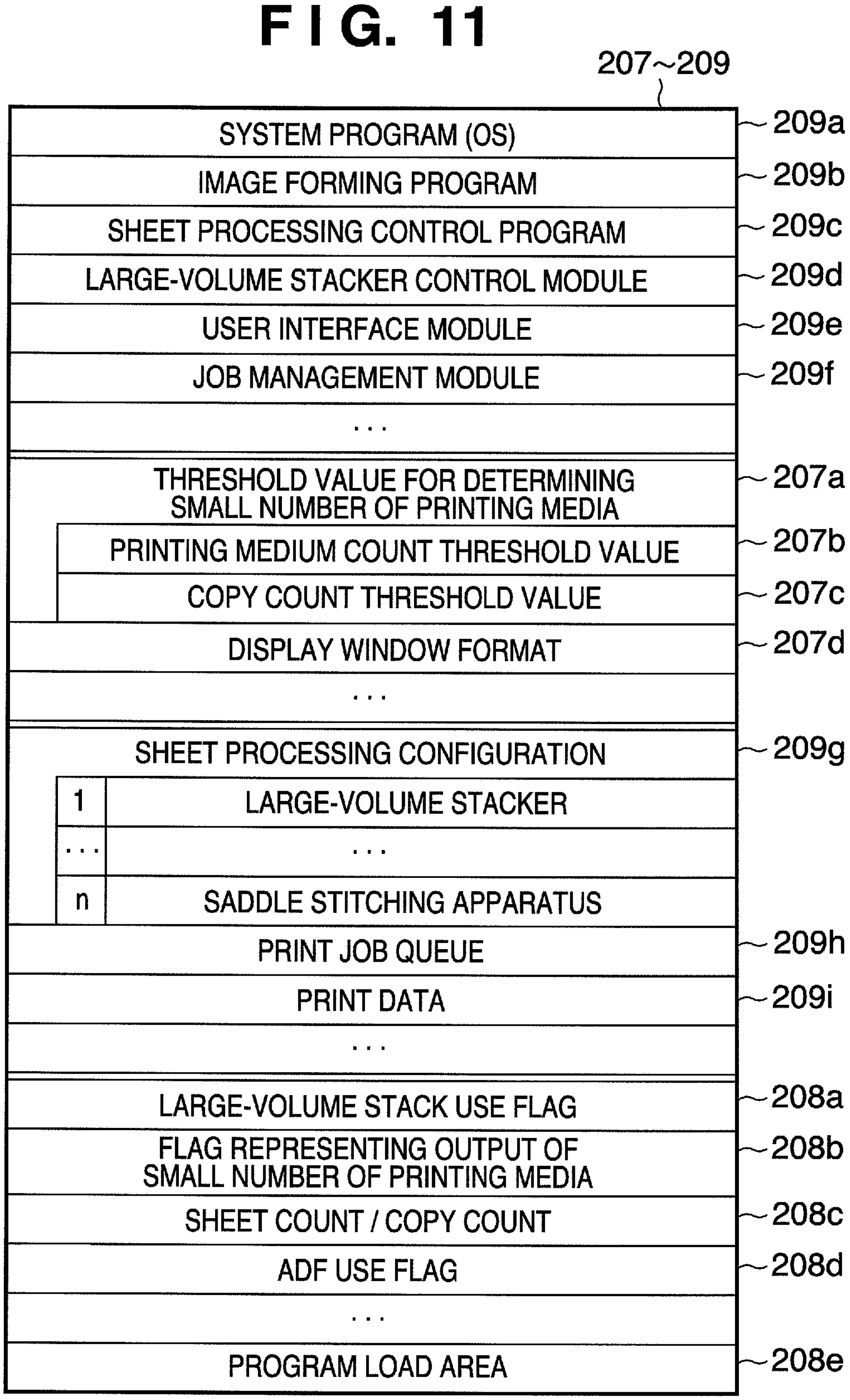
FIG. 11 is a view showing a structure of the memory of a print apparatus according to an embodiment.

FIG. 11 shows a structure of a memory used for the job processing method according to the embodiment. The memory includes the ROM 207, RAM 208, and HDD 209 in FIG. 2. The reference numerals of respective areas correspond to storage locations, but are not limited to them.

As a program in the HDD 209, the HDD 209 stores a system program 209*a* including an OS. The HDD 209 also stores an image forming program 209*b* to control image formation by the print apparatus 100. The HDD 209 also stores a sheet processing control program 209*c* to control conveyance and processing of printed sheets in the embodiment. The sheet processing control program 209*c* may be a program which instructs the control unit 205 to mainly perform sheet processing, or a program which designates processing and receives a status via communication between each stacker and the sheet processor. The HDD 209 also stores a large-volume stacker control module 209*d* to convey printed sheets to the large-volume stacker in the embodiment. The HDD 209 also stores a user interface module 209*e* to control the operation unit 204 to display a window and prompt the operator to input an instruction. The HDD 209 also stores a job management module 209*f* to manage a job, especially a queued print job in the embodiment. Note that FIG. 11 does not illustrate common programs and programs less related to the embodiment.

As a fixed parameter in the ROM 207, the ROM 207 stores a threshold value 207*a* for determining a small number of printing media in order to control stacker processing and job management processing in the embodiment. The threshold value 207*a* includes a printing medium count threshold value 207*b* representing a threshold value for the number of printing media, and a copy count threshold value 207*c* representing a threshold value for the number of copies. The ROM 207 also stores formats 207*d* of various display windows displayed on the operation unit 204 or transmitted to an external apparatus such as a host computer.

As data in the HDD 209, the HDD 209 stores a sheet processing configuration 209*g* which is data representing the connection between sheet processing apparatuses in the printing system. As the sheet processing configuration 209*g*, FIG. 11 shows a connection between the print apparatus 100, large-volume stacker, . . . , saddle stitching apparatus in the order named. The HDD 209 also stores a print job queue 209*h* which queues print jobs and rearranges them in the embodiment. The HDD 209 also stores print data.

The RAM 208 stores a large-volume stack use flag 208*a* representing whether a job uses the large-volume stacker. The large-volume stack use flag 208*a* is used as a temporary storage when the control unit 205 executes the above-mentioned programs. The RAM 208 also stores a flag 208*b* representing output of a small number of printing media. The flag 208*b* holds OFF "0" when the number of output printing media of a current print job is equal to or larger than the threshold value for determining a small number of printing media, and ON "1" when it is smaller than the threshold value. The RAM 208 also stores an output sheet count/copy count 208*c* of a current print job. The RAM 208 also stores an ADF use flag 208*d* representing whether to use the ADF. Further, the RAM 208 has a program load area 208*e* where a program stored in the HDD 209 is loaded and executed by the controller unit 205.

[Exemplary Arrangement of Print Job Queue]

Figure 12:
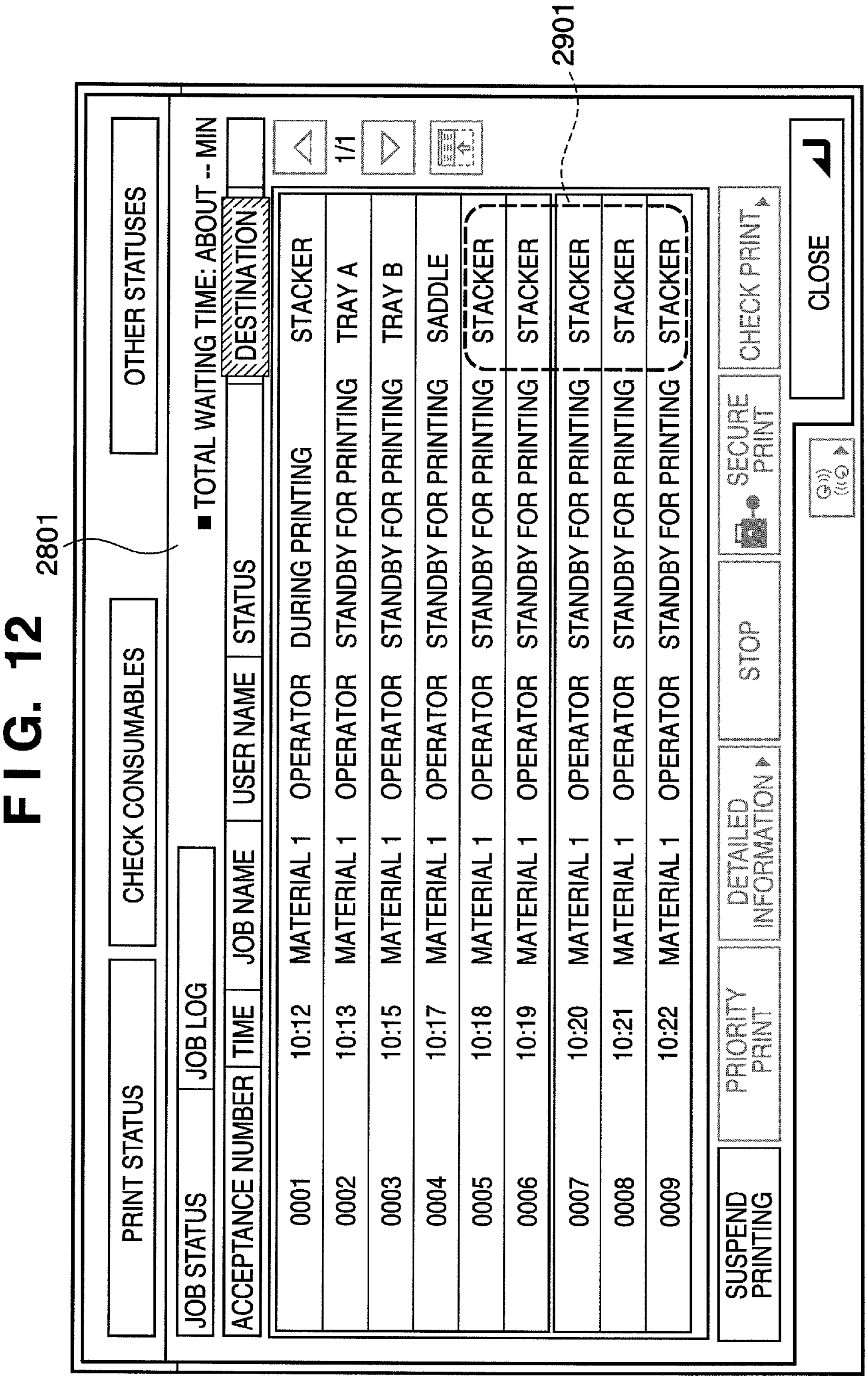
FIG. 12 is a view for explaining an example of display control to a target UI unit in the embodiment by referring to an example of a print job queue.

FIG. 12 shows an arrangement of the print job queue in the embodiment.

FIG. 12 shows a print job status displayed on the touch panel unit 401 as a kind of display upon pressing a system monitor key 617 under the control of the control unit 205. A window 2801 displays a status list of a job being printed by the print apparatus 100 and jobs waiting for printing. The destination of each job is designated. Successive jobs using the large-volume stacker as their destination are shown at 2901 in FIG. 12.

[Example of Print Job Management Procedures]

Figure 13:
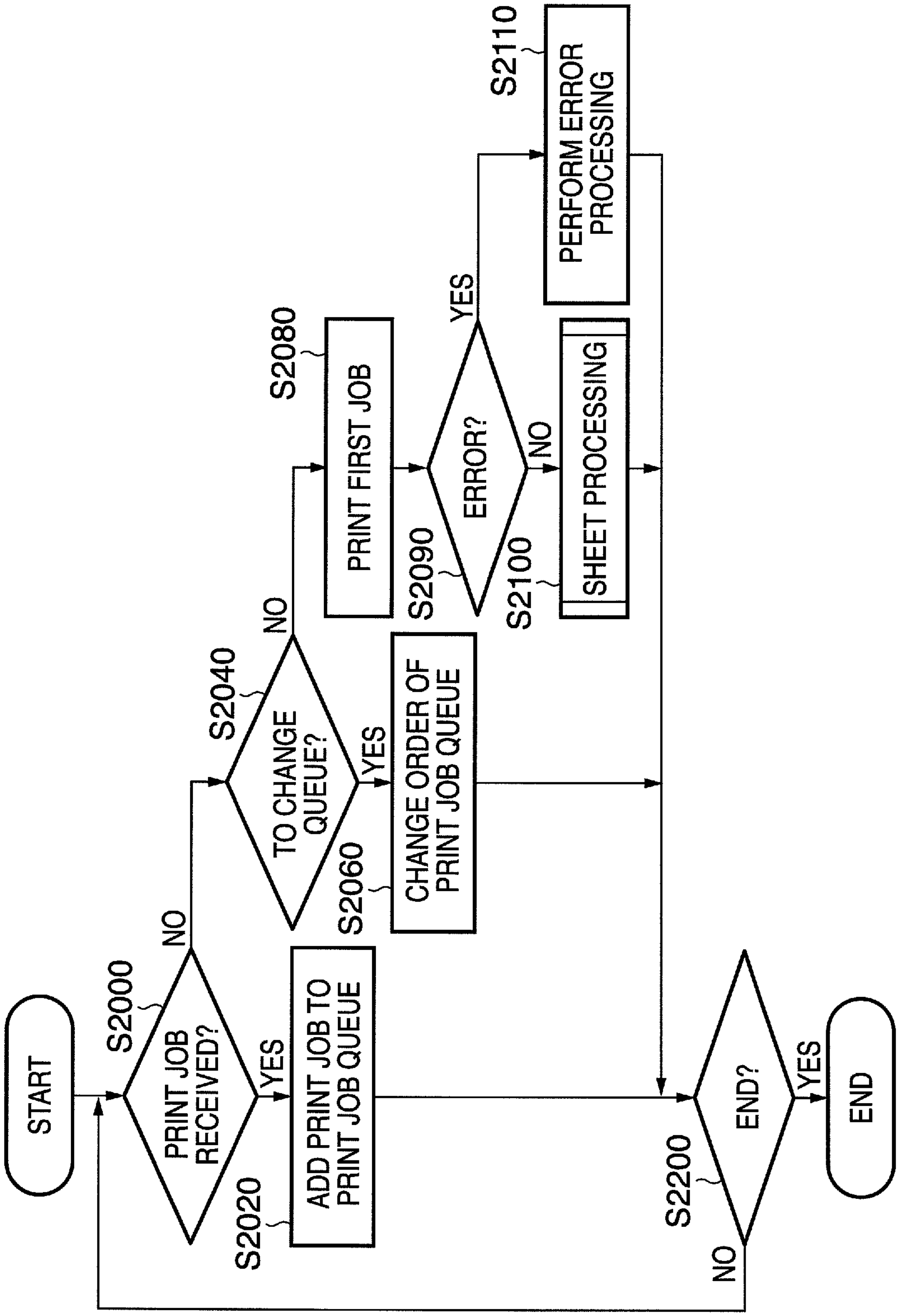
FIG. 13 is flowchart showing an example of print job management procedures in the embodiment.

FIG. 13 is flowchart showing an example of print job management procedures by the control unit 205 in the embodiment.

In step S2000, the control unit 205 determines whether it has received a new print job. The new print job includes a job from an external apparatus such as a host computer, a print job input from the operation unit 204 of the print apparatus 100, and a copy job to print an image scanned by the scanner unit 201. If the control unit 205 has received a new print job, the process advances to step S2020 to queue the new print job at the bottom of the print job queue 209*h*, as shown in FIG. 12. Although not shown in this example, if the configuration allows designating priority, a print job is queued in the priority order.

If the control unit 205 does not receive any new print job, the process advances to step S2040 to determine whether to change the queuing order. An applicable change condition is user designation from the operation unit 204 or a host computer, or a condition concerning a small-volume print job in the embodiment, which will be described later. If the queuing order is to be changed, the process advances to step S2060 to change the order of print jobs in the print job queue 209*h* in accordance with the user designation or condition.

If no queuing order is to be changed, the process advances to step S2080 to start printing the first job in the print job queue 209*h*. In step S2090, the control unit 205 determines whether an error occurs in print processing. If an error occurs, the process advances to step S2110 to perform predetermined error processing.

If no error occurs in print processing, the control unit 205 starts sheet processing in the embodiment in step S2100. Details of step S2100 will be explained below with reference to FIG. 14.

In step S2200, the control unit 205 determines whether the operation of the printing system ends. For example, the operation ends upon power-off. If the operation does not end, the process returns to step S2000 and is repeated.

[Example of Procedures of Sheet Processing (S2100)]

Figure 14:
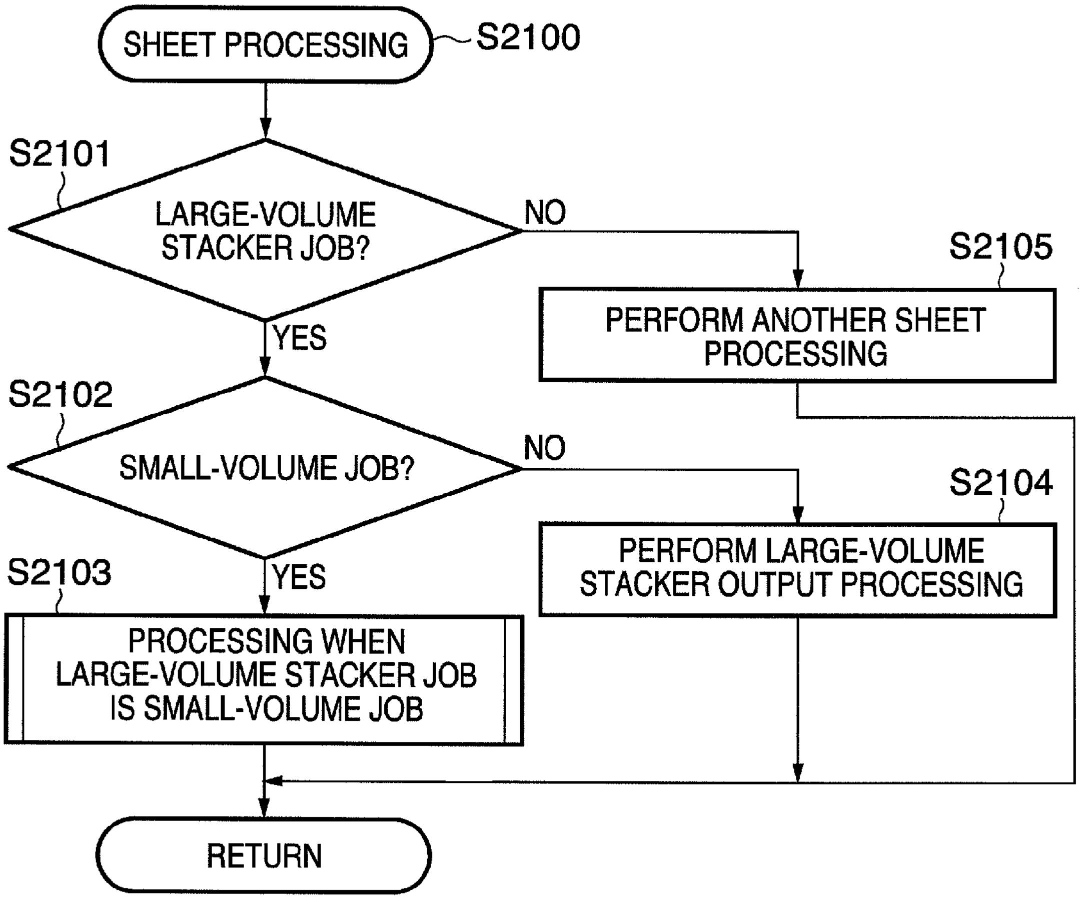
FIG. 14 is a flowchart showing an outline of determination processing by the control unit 205 for a small-volume job to the large-volume stacker, which is a feature of the embodiment.

FIG. 14 shows an example of detailed sheet processing procedures by the control unit 205 in S2100 of FIG. 13.

In step S2101, the control unit 205 determines whether a job to be printed in S2080 of FIG. 13 uses the large-volume stacker. The destination of each job is stored as shown in FIG. 12, and held by the large-volume stacker use flag 208*a* at the start of print processing. If the job does not use the large-volume stacker, the operator does not open the front door to take out printing media. Print interrupt, which is a problem of the embodiment, doe not occur, so the control unit 205 executes another sheet processing in step S2105.

If the job uses the large-volume stacker, the process advances to step S2102 to determine whether the job is a small-volume job. This determination is made on the basis of the flag 208*b* holding a result of comparing the number of printing media with the printing medium count threshold value 207*b* (e.g., 100 printing media) or the number of copies with the copy count threshold value 207*c*. If the job is not a small-volume job, the process advances to step S2104 to execute normal output processing to the large-volume stacker.

If the job is a small-volume job, the process advances to step S2103 to execute various processes according to the embodiment to prevent printing from being interrupted by the operator opening the door to take out printing media. These processes are executed when a large-volume stacker job requires a small number of printing media. Various examples of print interrupt preventing processing will be exemplified below.

Although processing examples 1 to 6 will be described independently, it is apparent that a combination of these processes enhances the effects of the present invention. An arbitrary combination of these processes also falls within the present invention.

Processing Example 1

Warning Processing for Small-Volume Job Using Large-Volume Stacker

Warning processing will be explained with reference to FIG. 15 as an example of processing in step S2103 for a small-volume job using the large-volume stacker.

Figure 15:
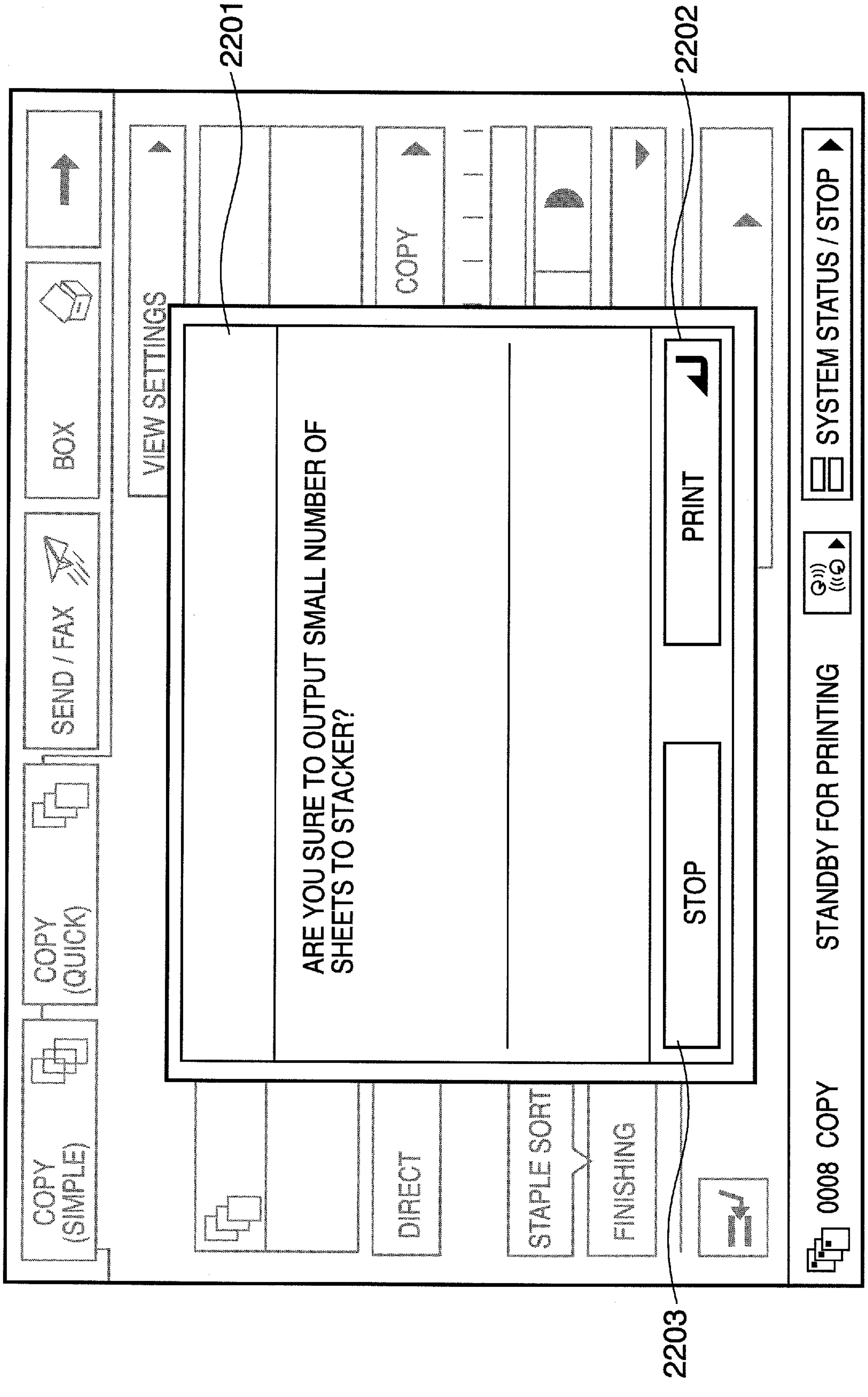
FIGS. 15 to 23 are views for explaining examples of display control to the target UI unit in the embodiment.

In step S2103, the control unit 205 displays a dialog 2201 in FIG. 15 on the touch panel unit 401. If the operator presses a "print" button 2202, the small number of printing media by the job are output to the large-volume stacker in accordance with the instruction. If the operator presses a "stop" button 2203, the dialog 2201 returns to an original setup window without outputting the small number of printing media by the job. This can prevent erroneous output of a small number of printing media by a small-volume job to the large-volume stacker. Time-consuming takeout work from the large-volume stacker can be avoided.

Processing Example 2

Device Setting for Small-Volume Job Using Large-Volume Stacker

Figure 16:
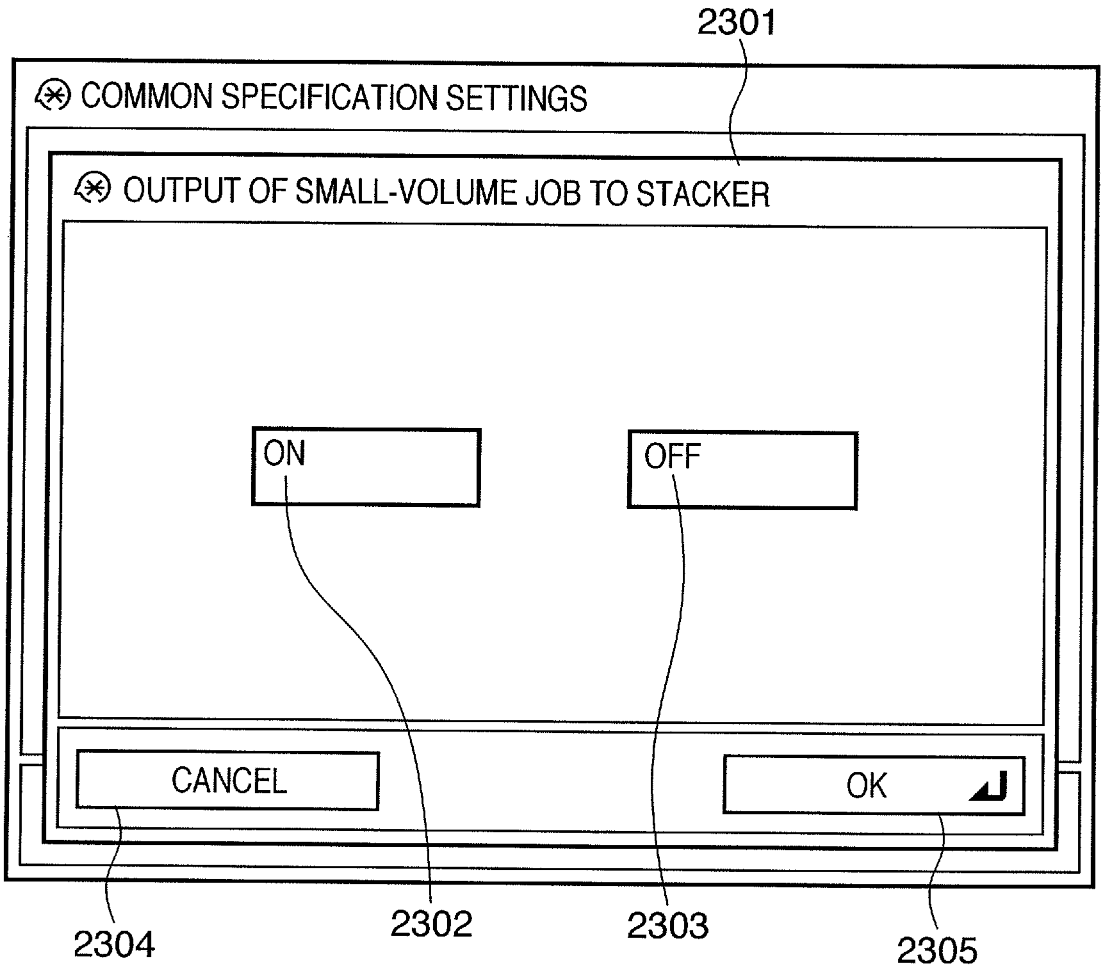

Switching of processing based on device setting will be explained with reference to FIG. 16 as another example of processing in step S2103 for a small-volume job using the large-volume stacker.

The control unit 205 displays common specification settings on the touch panel unit 401 as one of menus displayed when the operator presses the user mode key 505 of the key input unit 402. As one of the common specification settings, the control unit 205 displays a "output of a small-volume job to stacker" dialog 2301 shown in FIG. 16. The control unit 205 displays an ON button 2302 and an OFF button 2303, either of which is selectable. The operator selects either button, and the control unit 205 sets, as a device setting, whether to always permit or inhibit output of a small-volume job to a large-volume stacker. If the operator presses an OK button 2305 in the dialog 2301, the control unit 205 holds the setting content and ends the dialog. If the operator presses a cancel button 2304, the control unit 205 ignores the change and ends the dialog. In this example, the control unit 205 outputs the small number of printing media by the small-volume job directly to the large-volume stacker when the setting "output of a small-volume job to stacker" is ON, and does not output the small number of printing media by the small-volume job when the setting is OFF.

Processing Example 3

Sample Tray Output of Small-Volume Job Using Large-Volume Stacker

Figure 17:
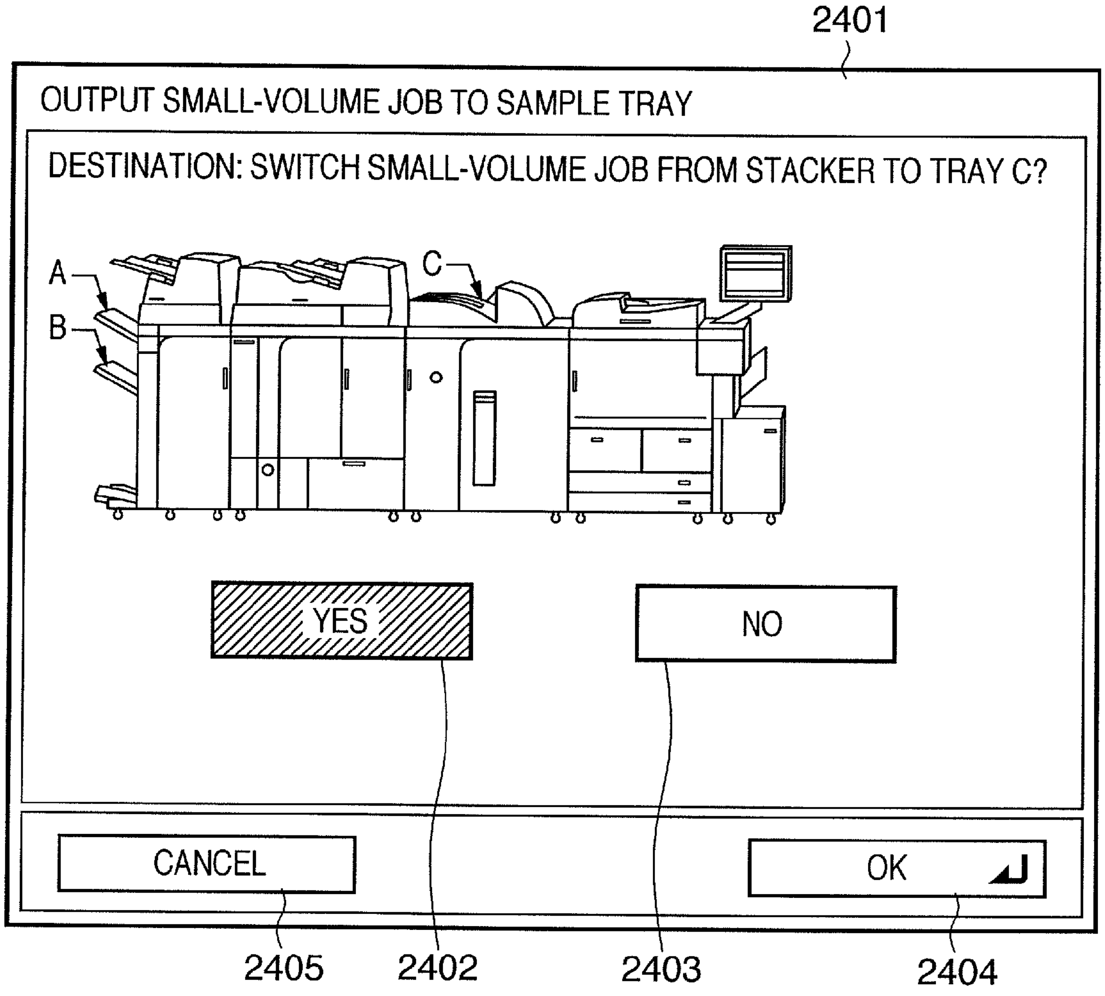

Switching output to sample tray will be explained with reference to FIG. 17 as still another example of processing in step S2103 for a small-volume job using the large-volume stacker.

In step S2103, the control unit 205 displays a "output small-volume job to sample tray" dialog 2401 on the touch panel unit 401. The control unit 205 inquires of the user whether or not to switch the destination from the designated large volume stacker to the sample tray. If the user presses a "YES" button 2402, the control unit 205 switches the destination to the sample tray. If the user presses a "NO" button 2403, the control unit 205 determines to output the small number of printing media by the small-volume job directly to the large-volume stacker. If the user presses an OK button 2404, the control unit 205 starts printing the job in accordance with the setting. If the user presses a cancel button 2405, the control unit 205 invalidates the setting and starts printing the job.

Processing Example 4

Figure 18:
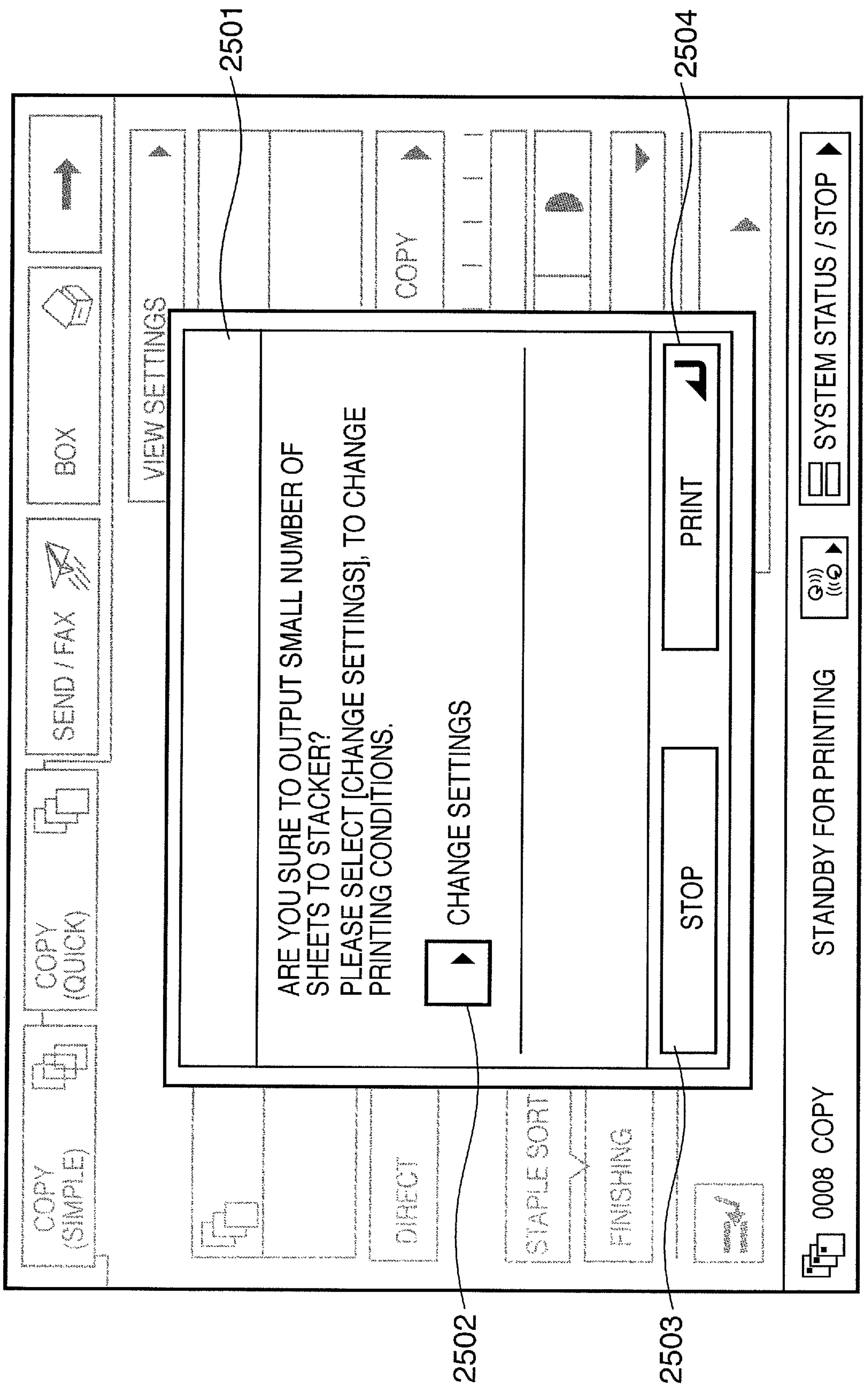
Figure 19:
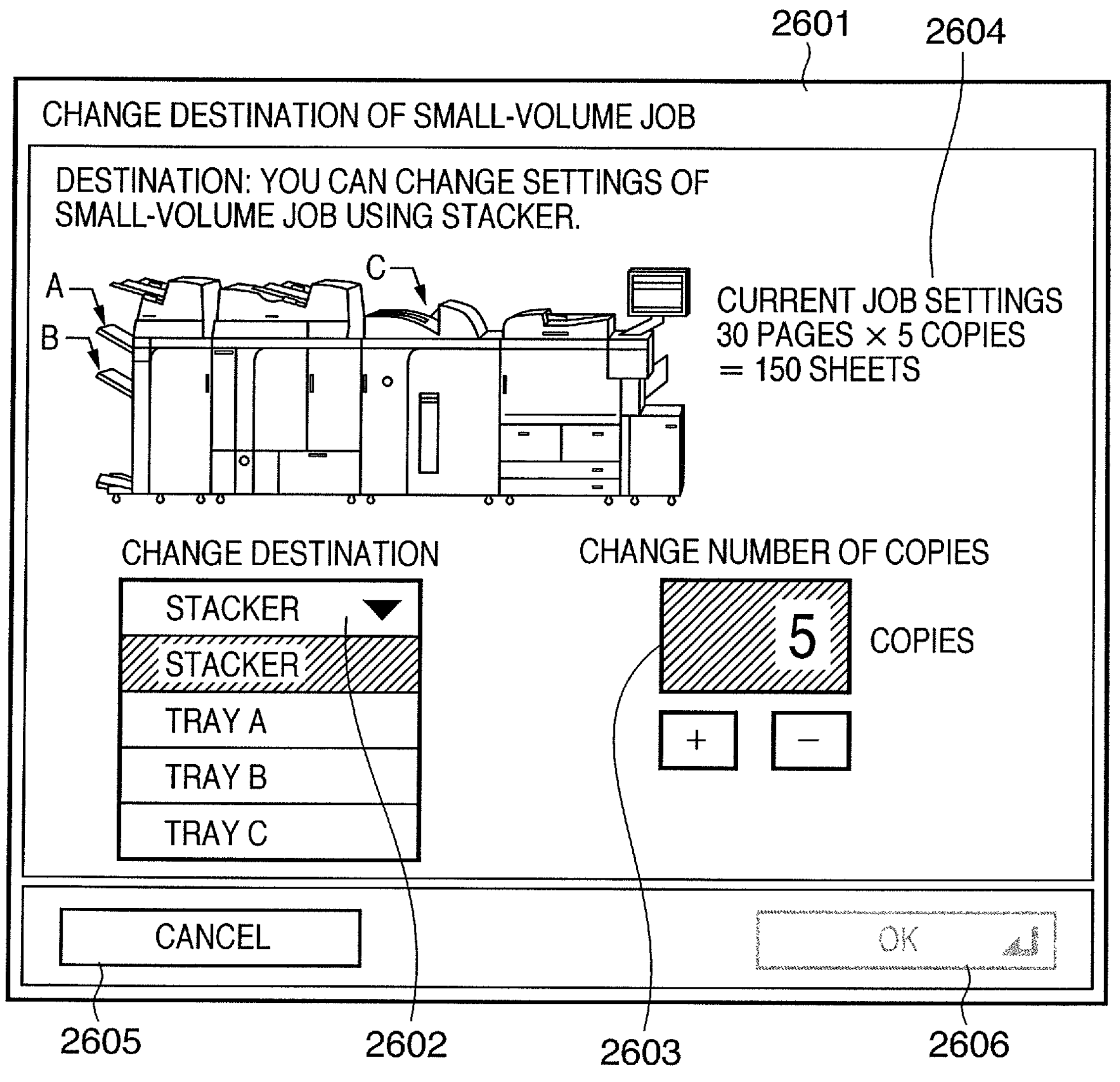

Confirmation of Setting Change in Small-Volume Job Using Large-Volume Stacker Setting change confirmation processing will be explained with reference to FIGS. 18 and 19 as still another example of processing in step S2103 for a small-volume job using the large-volume stacker.

In step S2103, the control unit 205 displays a dialog 2501 on the touch panel unit 401. If the operator presses a "print" button 2504, the control unit 205 starts printing. If the operator presses a "Stop" button 2503, the control unit 205 does not start printing. If the operator presses a setting change button 2502, the control unit 205 displays the "change the destination of small-volume job" dialog shown in FIG. 19 on the touch panel unit 401. The control unit 205 allows the operator to change settings of a print job by a change destination pull-down menu 2602 and a change copy count input box 2603. The control unit 205 dynamically displays current job settings in a field 2604. If the operator presses an OK button 2606, the control unit 205 validates the change of settings, and the dialog returns to the dialog 2501. If the operator presses a cancel button 2605, the control unit 205 invalidates the change of settings, and the dialog returns to the dialog 2501. As described above, even if the operator erroneously designates a small-volume job using the large-volume stacker, any operation error can be prevented by warning the operator before output and prompting the operator to change the destination and the number of copies by a simple operation.

Processing Example 5

Priority Processing of Subsequent Small-Volume Jobs Using Large-Volume Stacker

Figure 20:
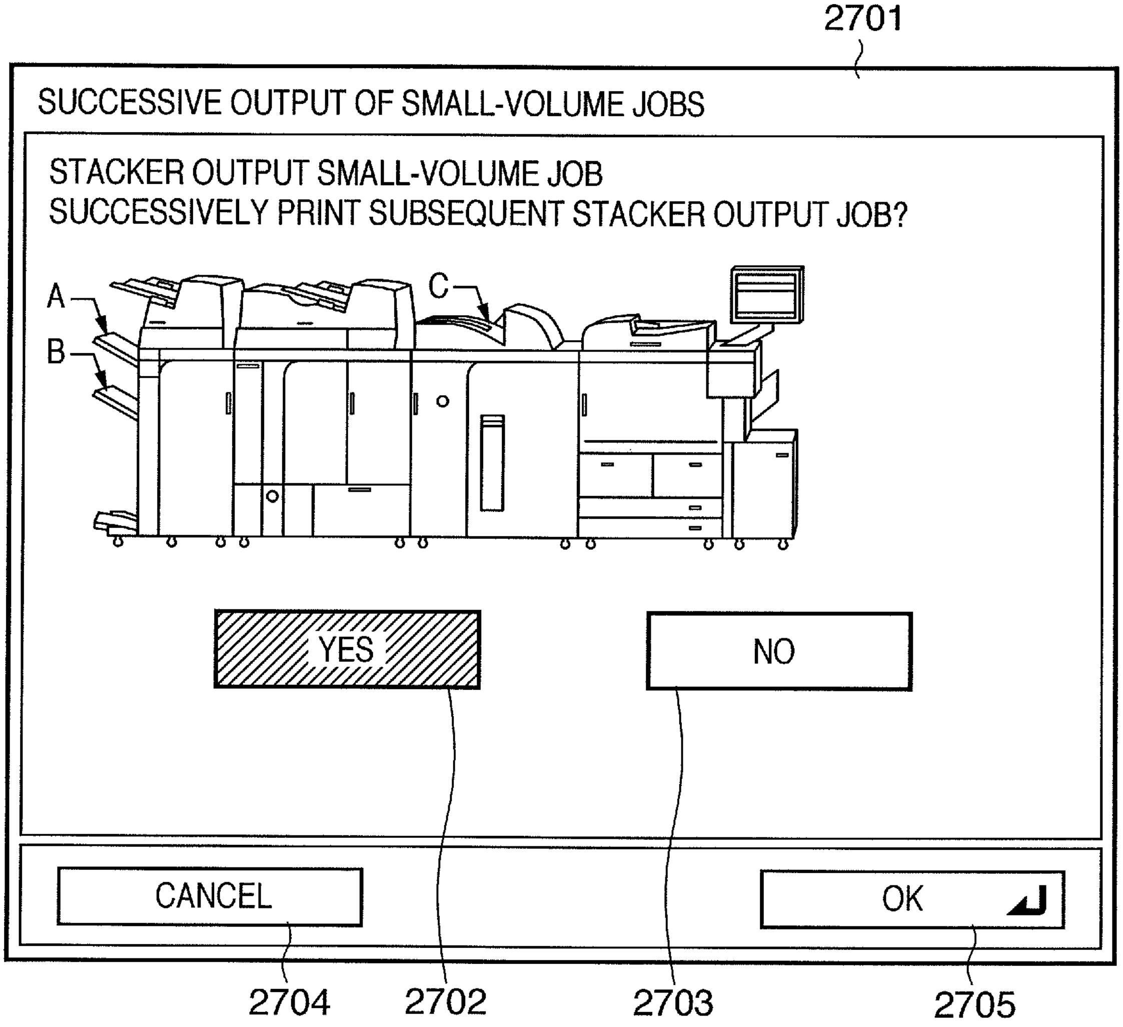
Figure 21:
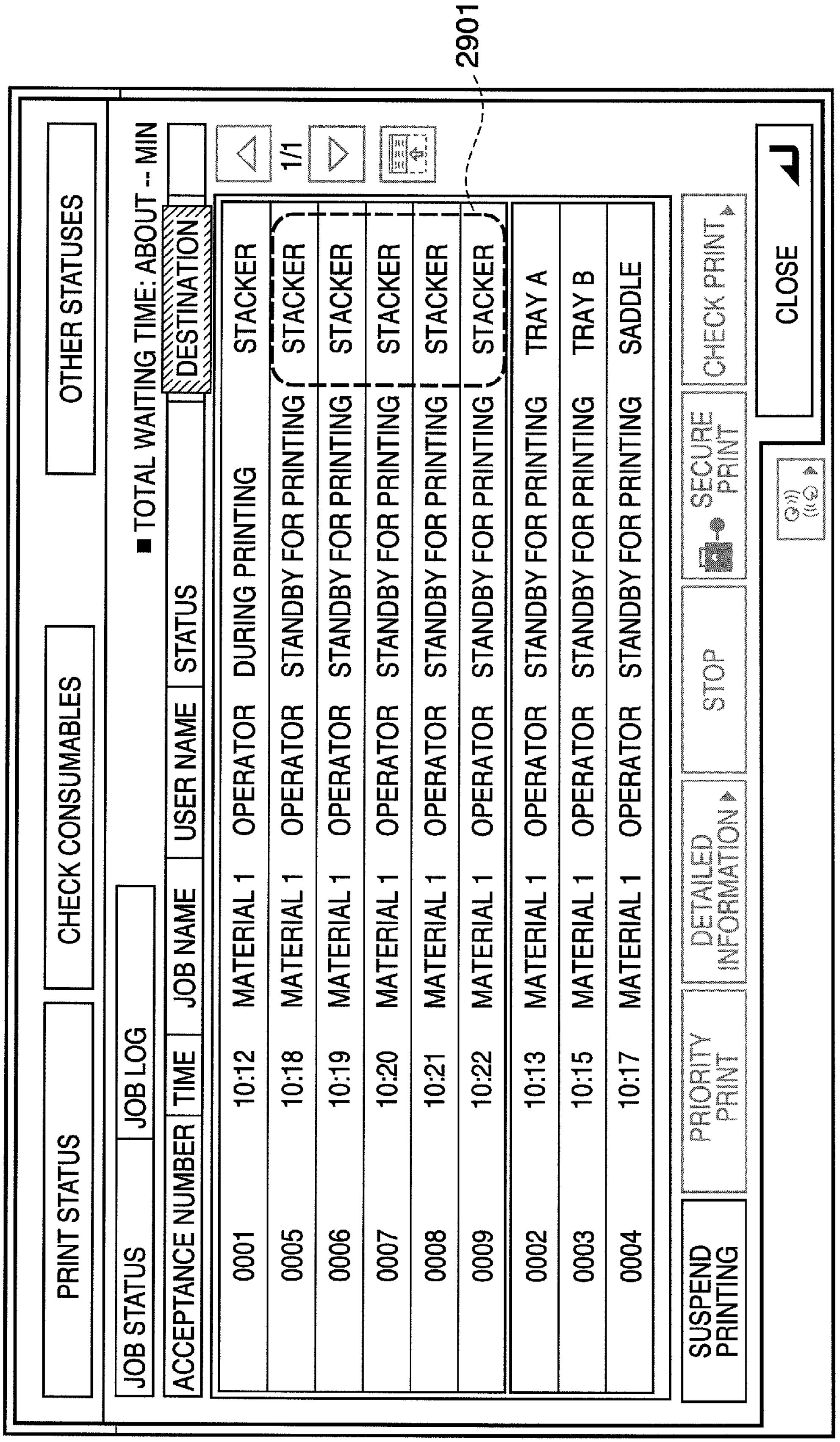

Priority processing of subsequent stacker job will be explained with reference to FIGS. 20, 12, and 21 as still another example of processing in step S2103 for a small-volume job using the large-volume stacker.

In step S2103, the control unit 205 displays a dialog 2701 on the touch panel unit 401, and inquires of the operator whether or not to successively print a subsequent stacker output job. If the operator presses a "YES" button 2702, the control unit 205 successively prints the subsequent stacker output job. If the operator presses a "NO" button 2703, the control unit 205 does not perform any special processing for the subsequent job. If the operator presses an OK button 2705, the control unit 205 validates the setting and starts printing. If the operator presses a cancel button 2704, the control unit 205 invalidates the setting and starts printing.

The statuses of preceding and succeeding jobs in this processing will be explained with reference to FIGS. 12 and 21.

The control unit 205 displays a print job status as shown in FIG. 12 on the touch panel unit 401 as a kind of display upon pressing the system monitor key 617. This window displays a status list of a job being printed by the print apparatus 100 and jobs waiting for printing. FIG. 12 shows an example of the job status when the control unit 205 starts step S2103. Subsequent jobs stand by at the start of processing in step S2103 to print a job of acceptance number 0001. The subsequent jobs 2901 include the jobs 0005-0009 using the large-volume stacker as their destination.

As processing in step S2103, if the control unit 205 detects press of the "YES" button 2702 and OK button 2705 in the dialog 2701, the control unit 205 changes the order of jobs to give high priority to jobs 0005-0009 using the large-volume stacker as their delivery destination over jobs 0002-0004 using other delivery destinations among subsequent jobs. FIG. 21 shows the result of this processing. The control unit 205 preferentially prints the subsequent jobs 2901 including jobs 0005-0009 using the large-volume stacker after printing of the current job 0001. The small number of printing media by the subsequent jobs 2901 can be subsequently output to the large-volume stacker, reducing the count of time-consuming takeout works of printed sheets from the large-volume stacker.

Processing Example 6

Figure 22:
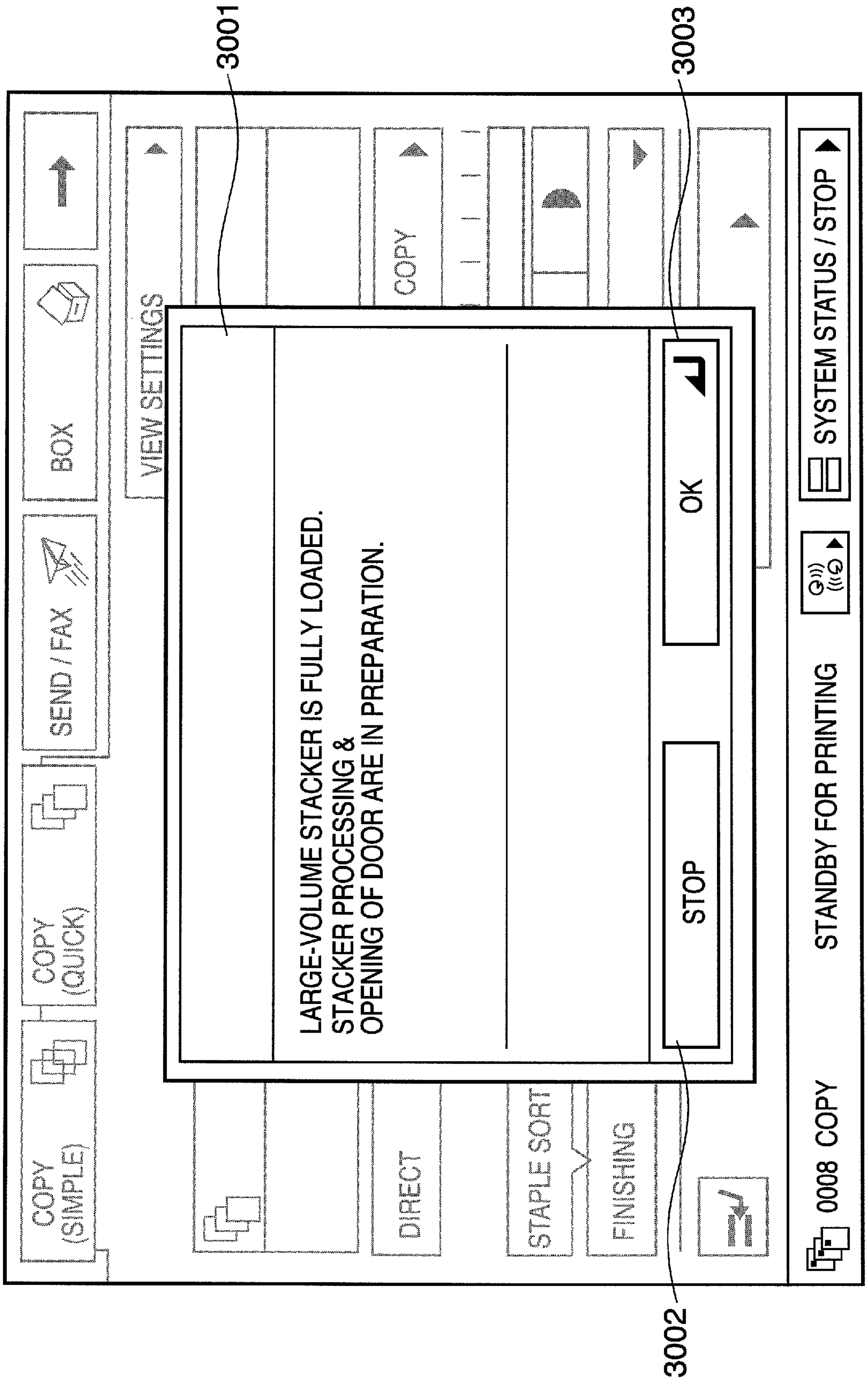
Figure 23:
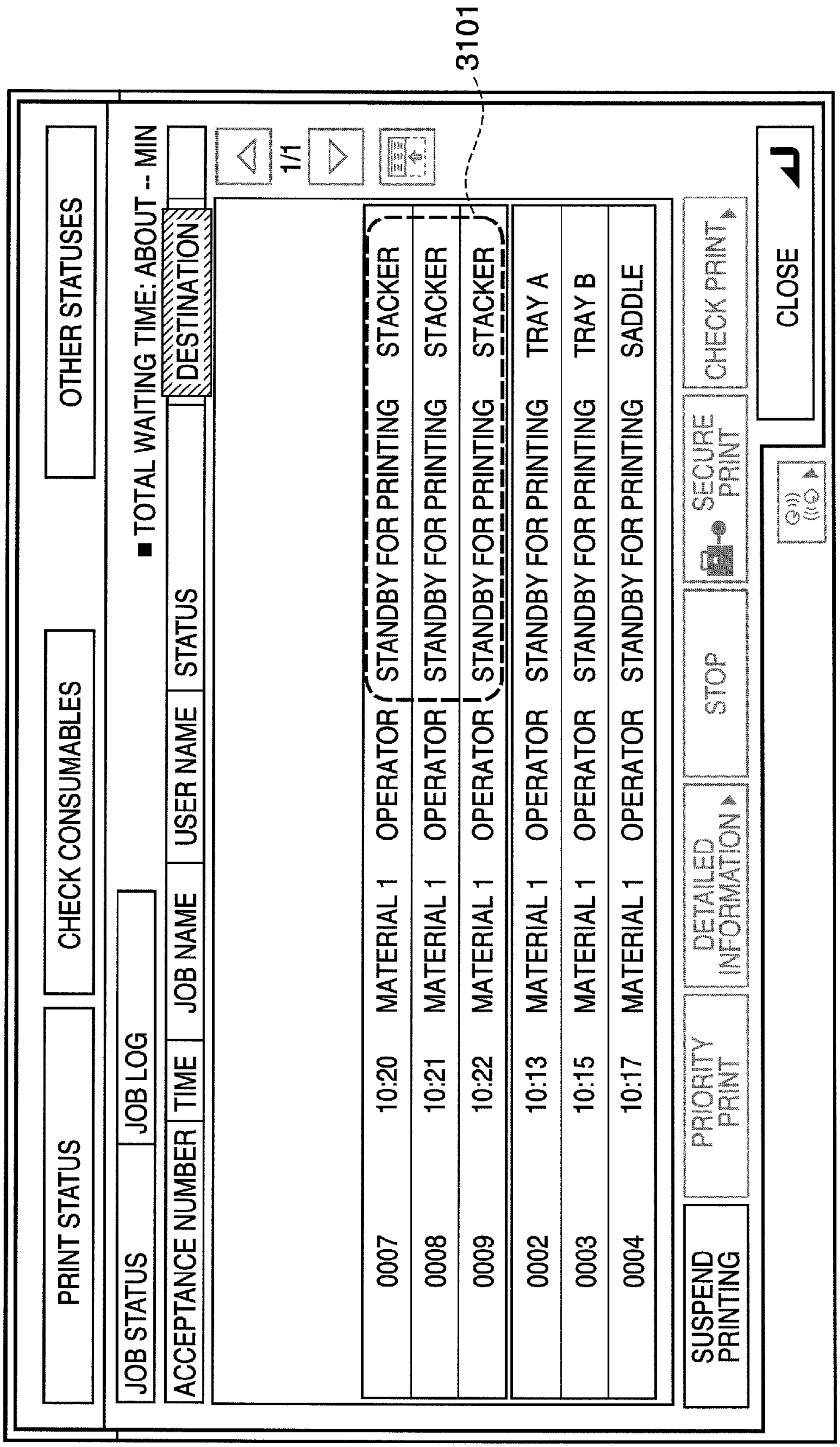

Automatic Takeout Preparation after Printing of Small-Volume Job Using Large-Volume Stacker Automatic takeout preparation after printing will be explained with reference to FIGS. 22 and 23 as still another example of processing in step S2103 for a small-volume job using the large-volume stacker.

In step S2103, the control unit 205 prints a small-volume job using the large-volume stacker. After the end of printing, the control unit 205 displays a dialog 3001 on the touch panel unit 401, and moves down the stack tray of the large-volume stacker in preparation for opening the door. This processing allows the operator to quickly take out printed sheets from the large-volume stacker.

In this case, the control unit 205 suspends subsequent large-volume stacker jobs in "wait for the stacker" until the operator takes out sheets from the large-volume stacker. FIG. 23 shows a window displayed at this time as the print job status by the control unit 205 on the touch panel unit 401. Jobs 0007-0009 are subsequent large-volume stacker jobs 3101 in "wait for the stacker". If the control unit 205 detects that the operator has taken out the printed sheets of a preceding large-volume stacker job, the control unit 205 prints the succeeding large-volume stacker jobs 3101.

[Determination Processing (S2102) when Copying Small-Volume Job Using Large-Volume Stacker]

Processing in step S2102 to determine whether or not a copy job is a small-volume job will be described with reference to FIGS. 24, 25, and 26.

As for a copy job, the number of pages are not always determined at the start of printing and the total number of printing sheets in the copy job are also not determined, unlike a PDL print job in which a number of pages and a number of copies have been determined at the start of printing. Thus, special processing is necessary to determine in step S2102 whether or not the copy job is a small-volume job.

Figure 24:
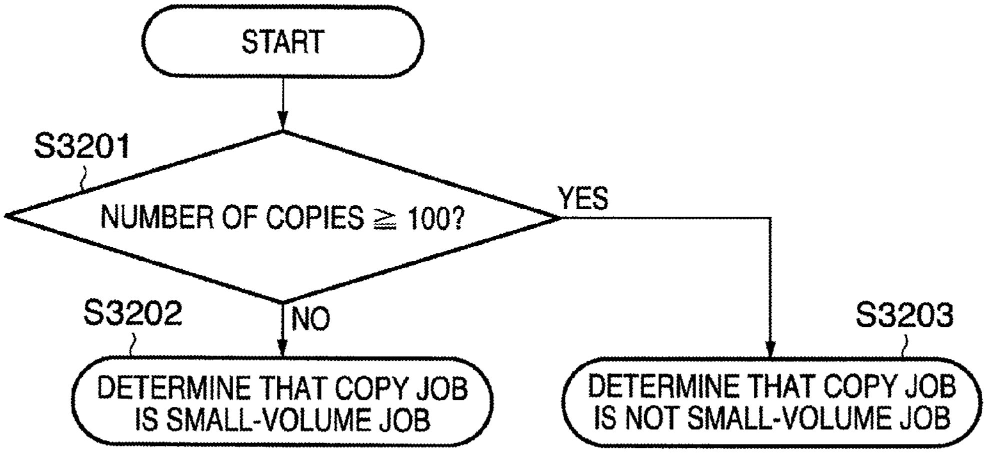
FIGS. 24 to 26 are flowcharts showing examples of small-volume job determination processing by the control unit 205 for a copy job in the embodiment.

FIG. 24 shows an example of the determination processing. For a copy job, the control unit 205 determines in step S2102 whether the copy job is a small-volume job (S3202) or not (S3203), on the basis of whether the number of copies is 100 or more, or less than 100, as represented in step S3201 of FIG. 24. Although the number of pages has not been determined, whether or not to execute small-volume job processing which is a feature of the present invention, is judged from only the determined number of copies.

Figure 25:
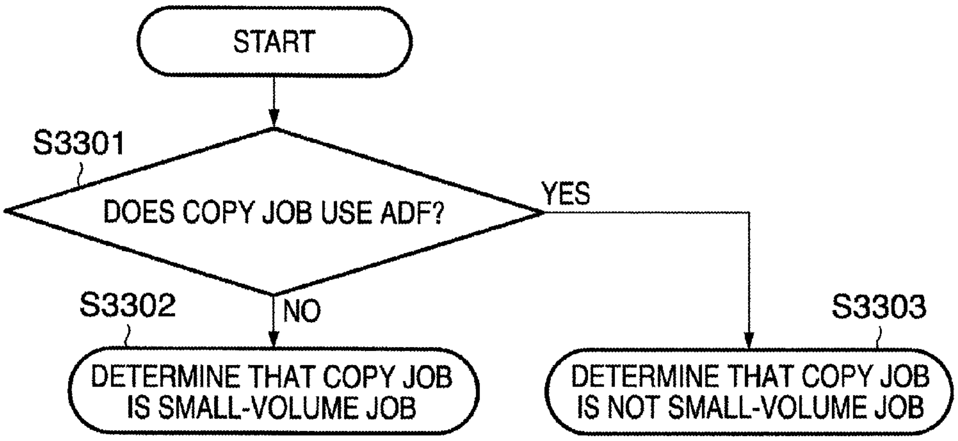

FIG. 25 shows another example of the determination processing. The print apparatus 100 comprises the ADF 301 and can automatically feed document sheets. For a copy job, the control unit 205 checks in step S2102 whether the copy job uses the ADF or not (S3301). Based on the check result, the control unit 205 determines whether the copy job is a small-volume job (S3302) or not (S3303). This processing is based on the fact that a large number of sheets are generally output for a copy job using the ADF in auto document feed.

Figure 26:
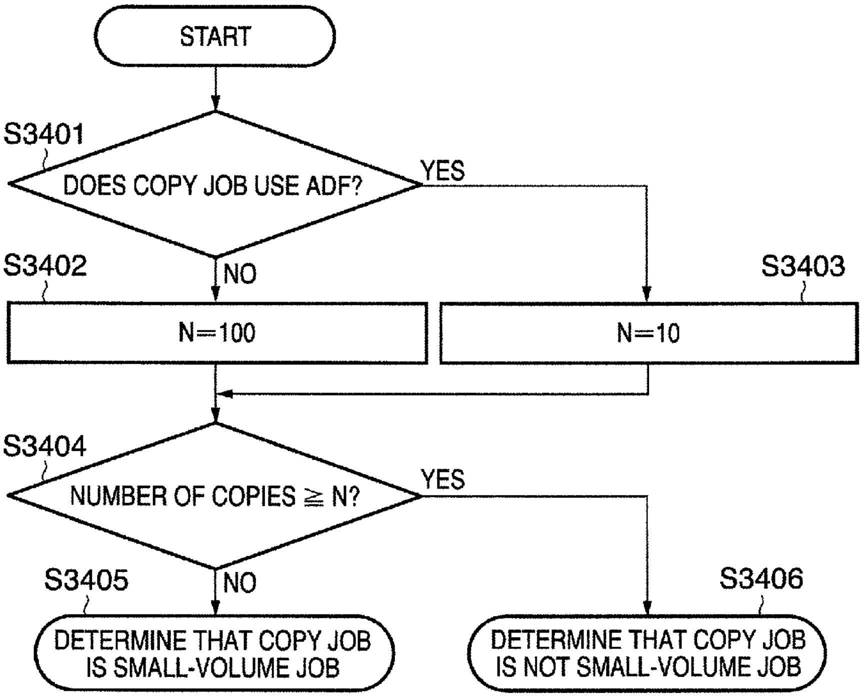

FIG. 26 shows still another example of the determination processing. For a copy job, the control unit 205 first checks in step S2102 whether the copy job uses the ADF or not, as represented in step S3401 of FIG. 26. The control unit 205 sets an internal variable value to N=100 (step S3402) if the copy job does not use the ADF, while N=10 (step S3403) if the copy job uses the ADF. If the number of copies of the job is smaller than N in step S3404, the control unit 205 determines that the copy job is a small-volume job (step S3405). If the number of copies of the job is equal to or larger than N, the control unit 205 determines that the copy job is not a small-volume job (step S3406). In this way, even for a copy job in which a number of page has not been determined at the start of printing, whether or not the job is a small-volume job can be more accurately determined by a combination of the ADF use status and the number of copies.

[Processing Example when Holding Job]

Figure 27:
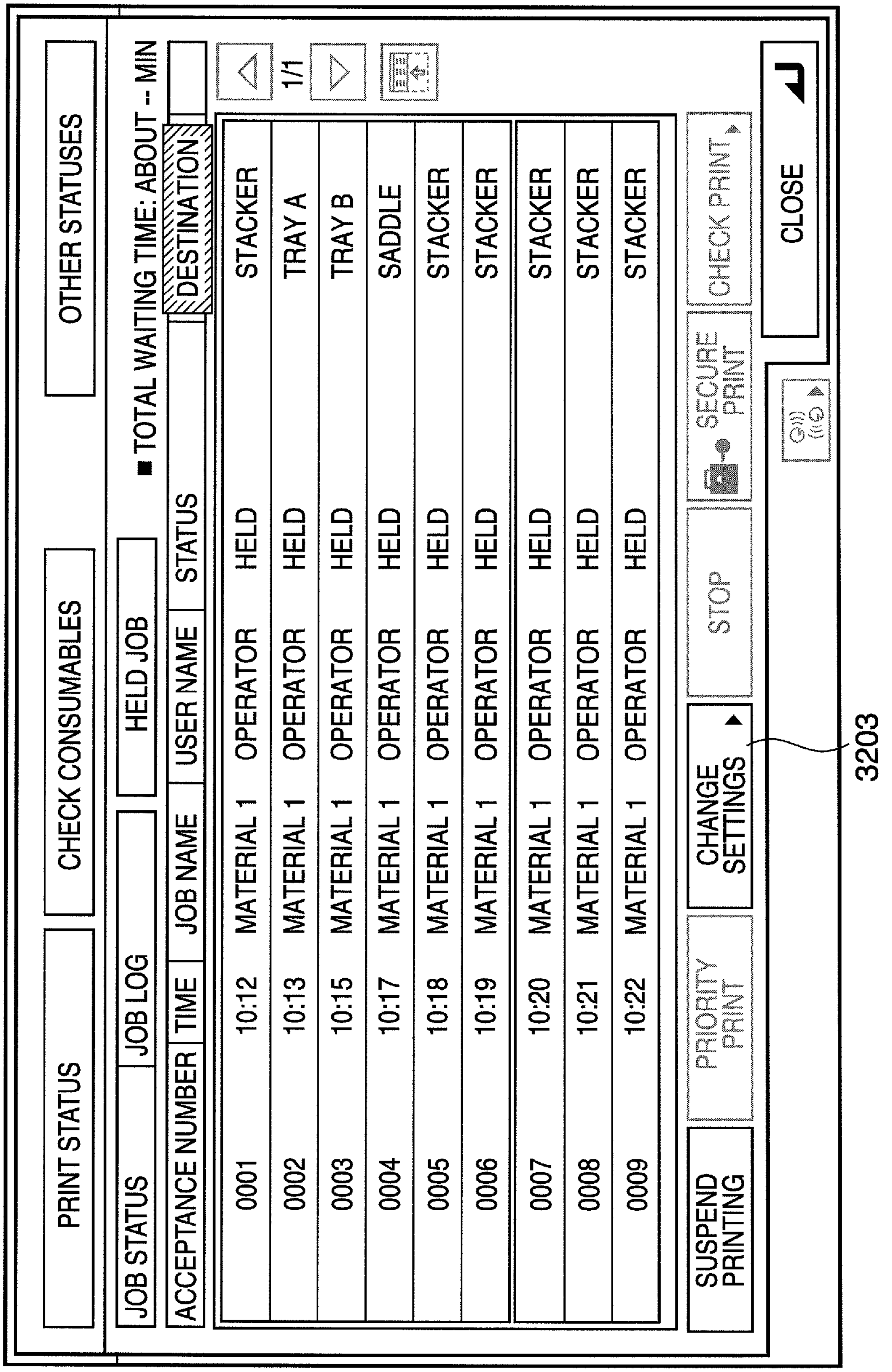
FIGS. 27 to 30 are views for explaining examples of display control to the target UI unit in the embodiment.

The print apparatus 100 according to the embodiment has a function of holding a print job in the HDD 209 together with settings, and then, if necessary, changing the settings and repetitively printing. The control unit 205 displays a held-job list as shown in FIG. 27 on the touch panel unit 401 as a kind of display upon pressing the system monitor key 617. This window displays a list of jobs held in the HDD 209 of the print apparatus 100.

Figure 28:
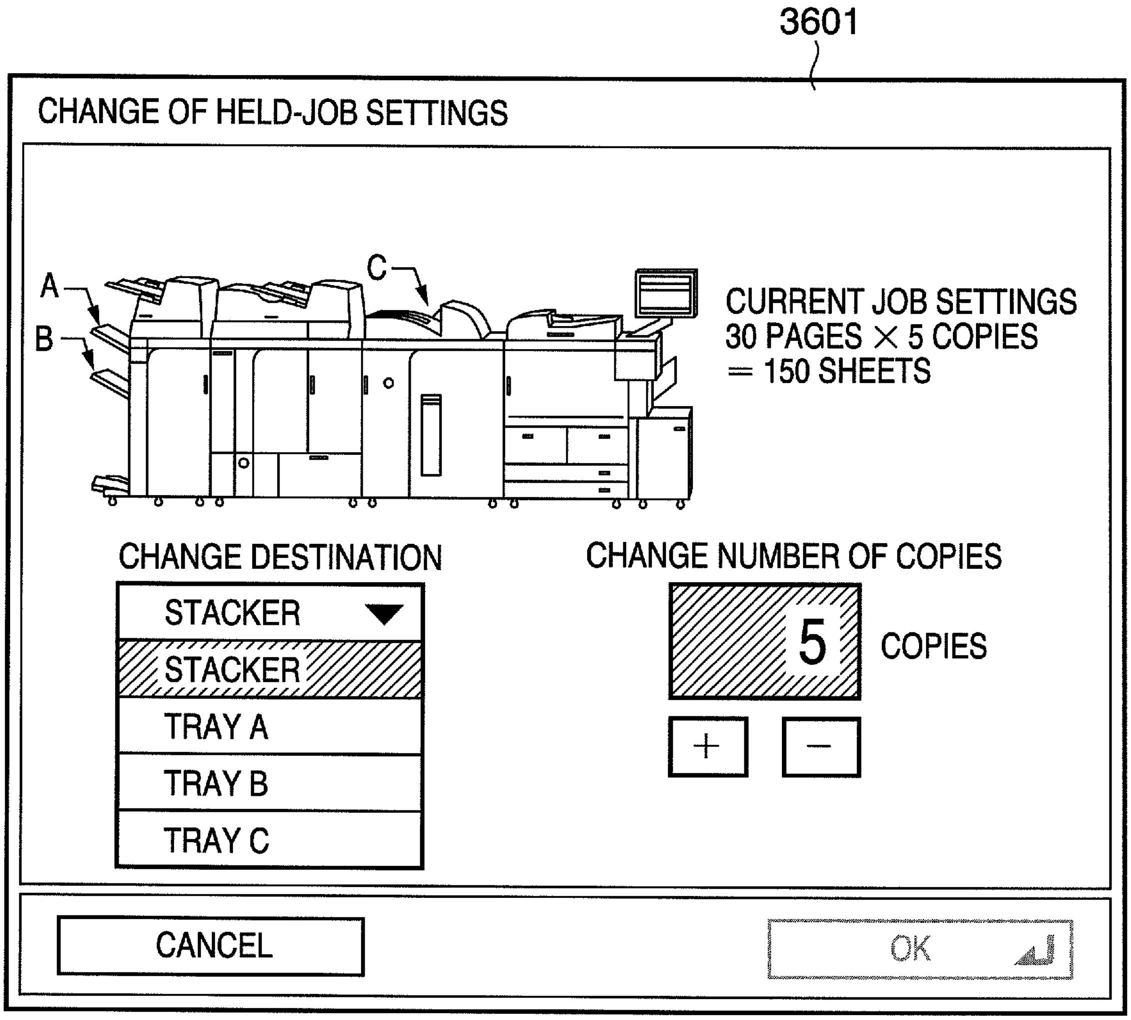

When the operator selects an arbitrary job displayed on the touch panel unit 401, the control unit 205 permits press of a setting change button 3203. If the operator presses the setting change button 3203, the control unit 205 displays a held-job setting change window as shown in FIG. 28 on the touch panel unit 401. In this example, the destination and the number of copies are changeable. Other settings such as the double-sided mode and color mode may be also changeable. Since job settings may change in reprinting of a held job, determination processing shown in FIG. 14 for a small-volume job using the large-volume stacker is performed on the basis of the latest job settings. The determination processing may be done in executing printing, or changing held-job settings as shown in FIG. 28.

[Processing Example in Printer Driver]

As described above, the print apparatus 100 can print from a host computer (e.g., the PC 103 or 104 in FIG. 1) using the printer driver. The printer driver of the host computer can also execute processing in the present invention.

Figure 29:
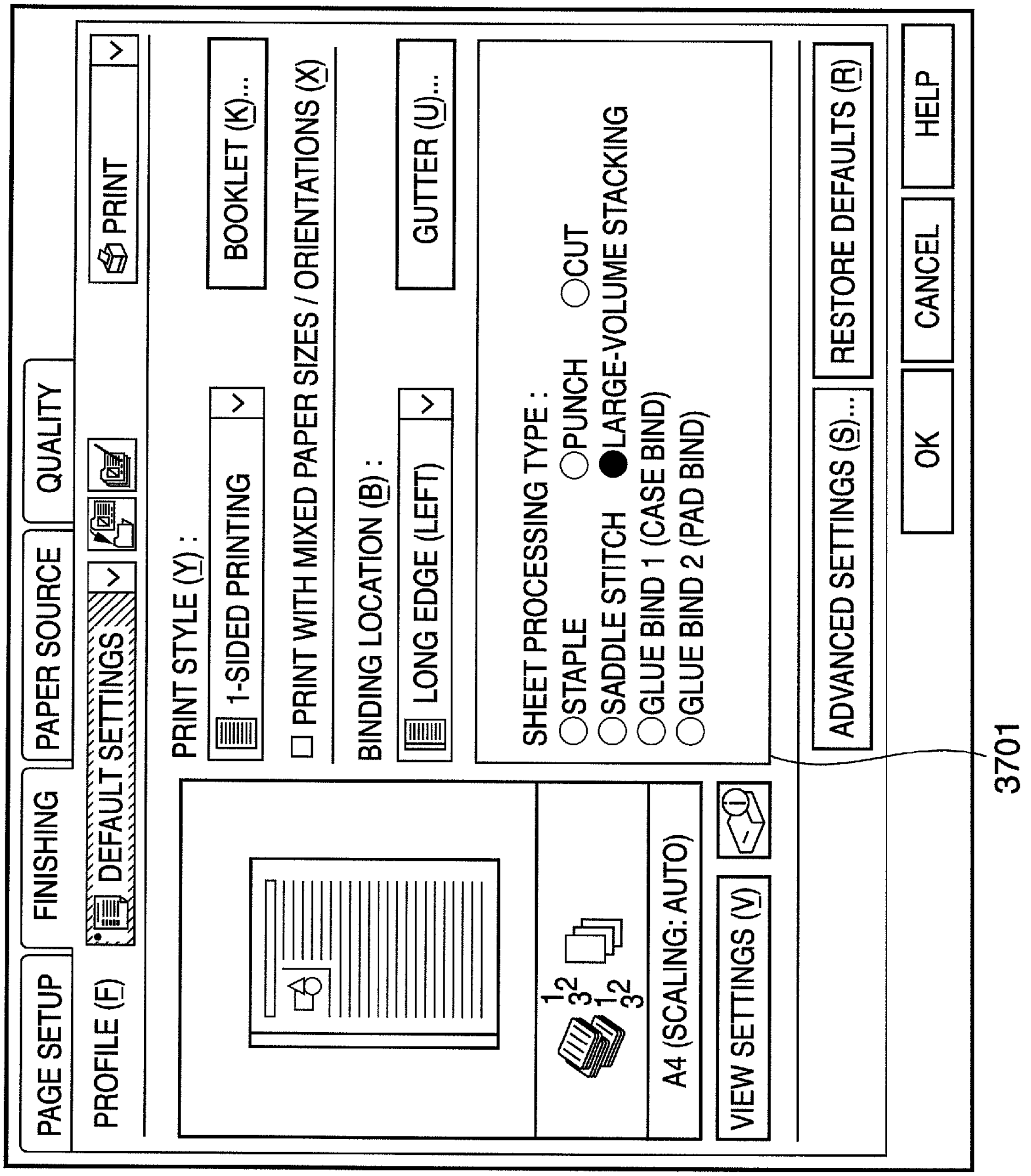
Figure 30:
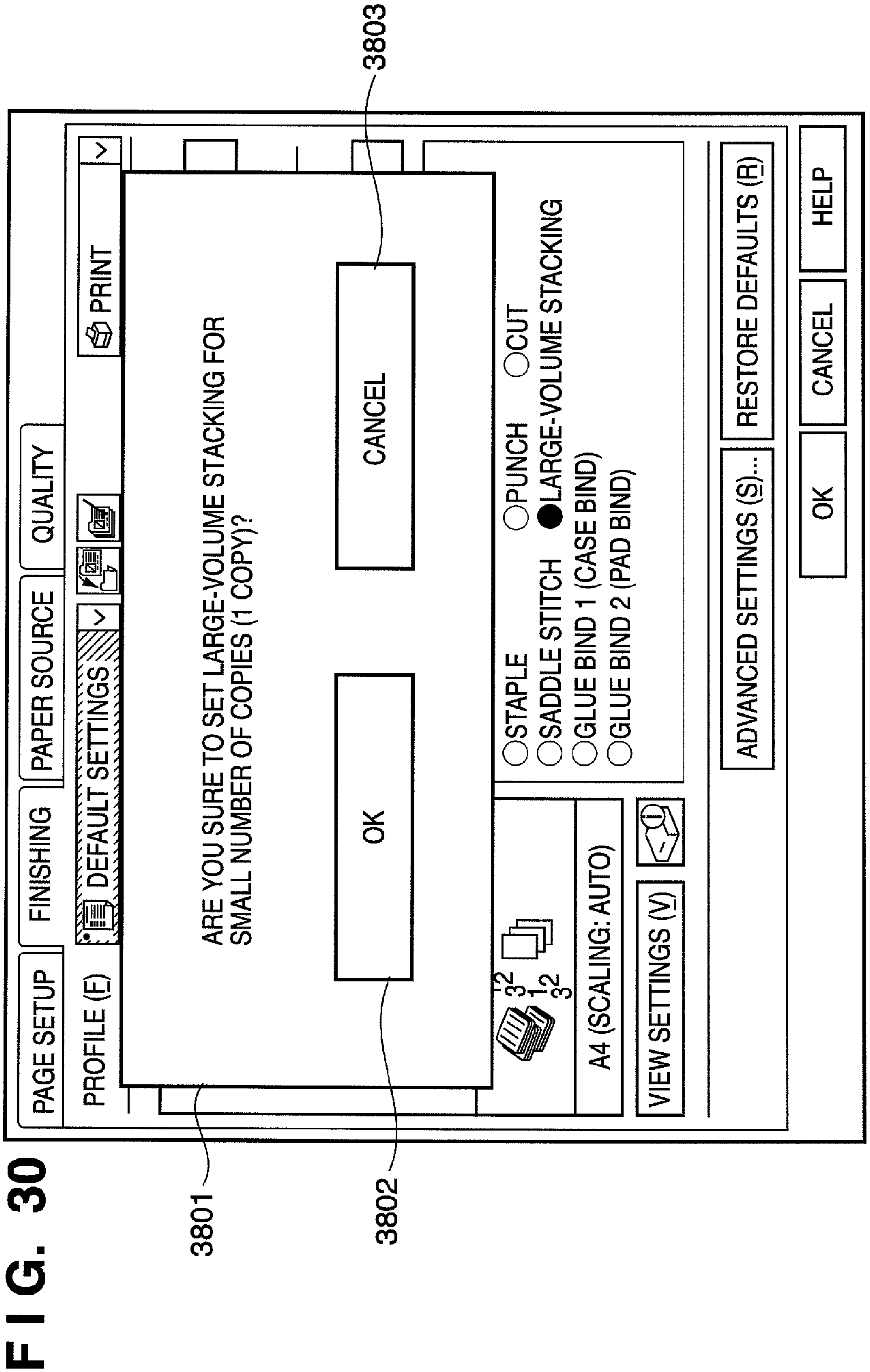

The CPU of the host computer displays a setup window as shown in FIG. 29 on the display of the host computer. If the operator selects "large-volume stacking" as a sheet processing type, as represented in a field 3701 in FIG. 29, the CPU of the host computer checks the number of copies by the job. The CPU of the host computer displays a confirmation window dialog 3801 as shown in FIG. 30 depending on whether or not the number of copies is smaller than a predetermined count, e.g., smaller than 100 copies. If the operator presses an OK button 3802, the CPU of the host computer validates setting of large-volume stacking. If the operator presses a cancel button 3803, the CPU of the host computer cancels selection of large-volume stacking.

In the embodiment, whether or not the job is a small-volume job is determined from only the number of copies because the host computer cannot recognize the number of pages by the job in processing by the printer driver. Whether or not the job is a small-volume job may also be determined from the number of pages and the number of copies if the host computer can recognize the number of pages by the job. Alternatively, the condition to determine whether or not the job is a small-volume job may is changed depending on another print job attribute (e.g., double-sided mode or N-up), in similar to processing based on use/non-use of the ADF in copying.

Effects which can be obtained by the above-described printing system 1000 according to the embodiment will be illustrated below.

The printing system 1000 can solve problems to build a user-friendly printing environment adaptable not only to the office environment but also to the POD environment can be built. The printing system 1000 can satisfy needs on actual work site in a printing environment such as the POD environment. Such needs include a need to operate the system at the highest productivity, and a need to reduce the work load on an operator. In particular, the printing system 1000 can attain the following effects.

Assume that a small-volume job is started, in which the small number of printing media are determined to output to a stacker requiring a series of operations to take out output sheets in consideration of conveyance of output sheets to an offline post-processing apparatus which handles a large-volume job. In this case, the output is inhibited or the destination is switched to another destination. This processing can achieve both easy handling of large-volume output and high job productivity in the printing system. The following processing is done when assigning a small-volume job to a delivery apparatus suited to a large-volume job but not to a small-volume job. For example, a warning is displayed, the small-volume job is controlled by device setting, or the delivery destination is switched to another destination suited to a small-volume job. Also, job settings are checked and changed, processing for set subsequent stacker job high priority is performed, or automatic takeout preparation is made after start of printing in a small-volume job using a large-volume stacker. This can avoid a decrease in productivity due to an operator instruction error. It is also possible to change the settings of a held job, or perform processing appropriate not only for a copy job but also for a print job.

A convenient, flexible printing environment capable of coping with use cases and needs assumable in the POD environment can be established. Various mechanisms can be provided toward practical use of a product.

Other Embodiments

A host computer (e.g., the PC 103 or 104) may use an externally installed program to achieve the functions shown in the drawings in the embodiment. In this case, data for displaying the same operation windows as those described in the embodiment including operation windows are externally installed to provide various user interface windows on the display of the host computer. For example, this has been described with reference to a configuration based on the UI window shown in FIG. 10. In this configuration, the present invention is also applicable to a case where pieces of information including a program are supplied to an output apparatus from a storage medium such as a CD-ROM, flash memory, or FD, or from an external storage medium via a network.

For this purpose, a storage medium which records software program codes for implementing the functions of the above-described embodiment is supplied to a system or apparatus. The computer (CPU or MPU) of the system or apparatus reads out and executes the program codes stored in the storage medium, achieving the object of the present invention.

In this case, the program codes read out from the storage medium implement new functions of the present invention, and the storage medium which stores the program codes constitutes the present invention.

The program form is arbitrary such as an object code, a program executed by an interpreter, or script data supplied to an OS as long as a program function is attained.

The storage medium for supplying the program includes a flexible disk, hard disk, optical disk, magnetooptical disk, MO, CD-ROM, CD-R, CD-RW, magnetic tape, nonvolatile memory card, ROM, and DVD.

In this case, the program codes read out from the storage medium implement the functions of the above-described embodiment, and the storage medium which stores the program codes constitutes the present invention.

As another program supply method, a client computer connects to an Internet homepage via the browser of the client computer. Then, the computer program of the present invention or a compressed file containing an automatic installing function is downloaded from the homepage to a recording medium such as a hard disk, thereby supplying the program. The program can also be implemented by grouping program codes which form the program of the present invention into a plurality of files, and downloading the files from different homepages. That is, claims of the present invention also incorporate a WWW server, FTP server, and the like which prompt a plurality of users to download the program files for implementing functional processes of the present invention by a computer.

The program of the present invention can be encrypted, stored in a storage medium such as a CD-ROM, and distributed to a user. A user who satisfies predetermined conditions is prompted to download decryption key information from a homepage via the Internet. The user executes the encrypted program using the key information, and installs the program in the computer.

The functions of the above-described embodiment are implemented when the computer executes the readout program codes. Also, the functions of the above-described embodiment are implemented when an OS (Operating System) or the like running on the computer performs some or all of actual processes on the basis of the instructions of the program codes.

The program codes read out from the storage medium may be written in the memory of a function expansion board inserted into the computer or the memory of a function expansion unit connected to the computer. Then, the CPU of the function expansion board or function expansion unit performs some or all of actual processes on the basis of the instructions of the program codes. These processes also implement the functions of the above-described embodiment.

The present invention may also be applied to a system including a plurality of devices or an apparatus formed by a single device. The present invention can also be achieved by supplying a program to the system or apparatus. In this case, the system or apparatus can obtain the effects of the present invention by providing, to the system or apparatus, a storage medium which stores a program represented by software for achieving the present invention.

The present invention is not limited to the above-described embodiment, and various modifications (including organic combinations of embodiments) can be made without departing from the gist of the invention, and are not excluded from the scope of the invention. For example, in the embodiment, the control unit 205 of the print apparatus 100 mainly executes various control operations. For example, the external controller of a housing different from the print apparatus 100 may execute some or all of the control operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-236754, filed Aug. 31, 2006, which is hereby incorporated by reference herein in its entirety.

What is claimed is:

1. A print control apparatus for controlling a print unit and an output unit that outputs sheets on which images are printed by the print unit, the print control apparatus comprising:

a reception unit adapted to receive a print job;

a determination unit adapted to determine whether or not an output destination designated for the print job received by the reception unit is a specific stacking unit;

a detection unit adapted to, if the determination unit determines that the designated output destination is the specific stacking unit, detect a number of sheets on which images are to be printed in accordance with the print job by the print unit; and a control unit adapted to:

if the number of sheets, on which images are to be printed, detected by the detection unit is greater than a predetermined number of sheets, control the print unit to print images on sheets in accordance with the print job and the output unit to output the sheets on which the images are printed to the specific stacking unit; and if the number of sheets, on which images are to be printed, detected by the detection unit is not greater than the predetermined number of sheets, control a display unit to display a screen for receiving user's designation of output destination of the sheets, control the print unit to print images on sheets in accordance with the print job, and control the output unit to output the sheets on which the images are printed to the output destination designated by the user via the screen displayed by the display unit.

2. The apparatus according to claim 1, wherein the control unit restricts execution of printing by the print unit while sheets are being removed by the user from the output destination designated in the print job received by the reception unit.

3. The apparatus according to claim 1, wherein the control unit allows execution of printing by the print unit while sheets are being removed by the user from the output destination designated by the user.

4. The apparatus according to claim 1, wherein the detection unit detects the number of sheets based on a number of sheets set for the print job received by the reception unit.

5. The apparatus according to claim 1, wherein the detection unit detects the number of sheets based on a type of the print job received by the reception unit.

6. The apparatus according to claim 1, further comprising:

a reading unit adapted to optically read an image of a document on a document table; and a feeding unit adapted to feed the document to the document table, wherein the detection unit detects the number of sheets based on whether or not the print job received by the reception unit uses the feeding unit.

7. The apparatus according to claim 1, wherein the specific stacking unit stacks the sheets on which images are printed by the print unit, and requires interruption of printing by the print unit when an operator takes out the stacked sheets from the specific stacking unit.

8. A method of controlling a print control apparatus for controlling a print unit and an output unit that outputs sheets on which images are printed by the print unit, the method comprising the steps of:

receiving a print job;

determining whether or not an output destination designated for the received print job is a specific stacking unit;

detecting, if the designated output destination determined in the determining step is the specific stacking unit, a number of sheets on which images are to be printed in accordance with the print job by the print unit;

if the number of sheets, on which images are to be printed, detected in the detecting step is greater than a predetermined number of sheets, controlling the print unit to print images on sheets in accordance with the print job and the output unit to output the sheets on which the images are printed to the specific stacking unit; and if the number of sheets, on which images are to be printed, detected in the detection step is not greater than the predetermined number of sheets, controlling a display unit to display a screen for receiving user's designation of output destination of the sheets, controlling the print unit to print images on sheets in accordance with the print job, and controlling the output unit to output the sheets on which the images are printed to the output destination designated by the user via the screen displayed by the display unit.

9. A non-transitory computer-readable storage medium storing a computer program executable by a processor of a print control apparatus to execute the method of controlling a print unit and an output unit that outputs sheets on which images are printed by the print unit, the method comprising the steps of:

receiving a print job;

determining whether or not an output destination designated for the received print job is a specific stacking unit;

detecting, if the designated output destination determined in the determining step is the specific stacking unit, a number of sheets on which images are to be printed in accordance with the print job by the print unit;

if the number of sheets, on which images are to be printed, detected in the detecting step is greater than a predetermined number of sheets, controlling the print unit to print images on sheets in accordance with the print job and the output unit to output the sheets on which the images are printed to the specific stacking unit; and if the number of sheets, on which images are to be printed, detected in the detection step is not greater than the predetermined number of sheets, controlling a display unit to display a screen for receiving user's designation of output destination of the sheets, controlling the print unit to print images on sheets in accordance with the print job, and controlling the output unit to output the sheets on which the images are printed to the output destination designated by the user via the screen displayed by the display unit.

* * * * *